United States Patent
Al-Salem et al.

(10) Patent No.: US 10,602,099 B2
(45) Date of Patent: Mar. 24, 2020

(54) COGEN-MOM INTEGRATION USING TABULATED INFORMATION RECOGNITION

(71) Applicant: Saudi Arabian Oil Company, Dhahran (SA)

(72) Inventors: Hussain Al-Salem, Dammam (SA); Fouad M. Alkhabbaz, Qatif (SA); Srinidhi Mallur, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 81 days.

(21) Appl. No.: 16/031,587

(22) Filed: Jul. 10, 2018

(65) Prior Publication Data
US 2020/0021781 A1 Jan. 16, 2020

(51) Int. Cl.
| | | |
|---|---|---|
| H04L 9/00 | (2006.01) | |
| H04N 7/18 | (2006.01) | |
| G05B 19/418 | (2006.01) | |
| G06T 11/60 | (2006.01) | |

(52) U.S. Cl.
CPC ......... *H04N 7/188* (2013.01); *G05B 19/4188* (2013.01); *H04N 7/183* (2013.01); *G05B 2219/31001* (2013.01); *G06T 11/60* (2013.01)

(58) Field of Classification Search
CPC ..... H04N 7/188; H04N 7/183; G05B 19/4188
USPC .......................................................... 348/86
See application file for complete search history.

(56) References Cited

U.S. PATENT DOCUMENTS

| | | |
|---|---|---|
| 6,747,372 B2 | 6/2004 | Gilbreth et al. |
| 6,882,904 B1 | 4/2005 | Petrie et al. |
| 7,536,547 B2 | 5/2009 | Van Den Tillaart |
| 8,039,991 B2 | 10/2011 | Wakitani et al. |
| 8,792,115 B2 | 7/2014 | Harano |
| 8,972,742 B2 | 3/2015 | Troncoso Pastoriza et al. |
| 9,147,174 B2 | 9/2015 | Glickman et al. |
| 9,210,179 B2 | 12/2015 | Mevec et al. |
| 2005/0015624 A1 | 1/2005 | Ginter et al. |
| 2005/0228683 A1 | 10/2005 | Saylor et al. |

(Continued)

FOREIGN PATENT DOCUMENTS

| | | |
|---|---|---|
| EP | 3196716 | 7/2017 |
| WO | 2015058134 | 4/2015 |
| WO | 2016097998 | 6/2016 |

OTHER PUBLICATIONS

PCT International Search Report and Written Opinion in International Appln. No. PCT/US20019/039913, dated Sep. 13, 2019, 12 pages.

*Primary Examiner* — Nguyen T Truong
(74) *Attorney, Agent, or Firm* — Fish & Richardson P.C.

(57) ABSTRACT

The present disclosure describes methods and systems for integrating third party automation systems. One computer-implemented method includes calculating, by at least one of a first device and a second device, a risk level, and controlling, by the at least one of the first device and the second device, a switch based on the risk level. If the risk level is less than a predetermined value, the switch is controlled to power on an image display and capturing device. Data is displayed by the first device and received by the second device through visual recognition on the image display and capturing device. If the risk level is not less than the predetermined value, the switch is controlled to power off the image display and capturing device. Data transfer from the first device to the second device through visual recognition on the image display and capturing device is stopped.

20 Claims, 13 Drawing Sheets

(56) References Cited

U.S. PATENT DOCUMENTS

| | | |
|---|---|---|
| 2007/0018009 A1 | 1/2007 | Choi et al. |
| 2010/0292857 A1 | 11/2010 | Bose et al. |
| 2011/0178977 A1 | 7/2011 | Drees |
| 2011/0288692 A1 | 11/2011 | Scott |
| 2012/0022700 A1 | 1/2012 | Drees et al. |
| 2013/0086650 A1 | 4/2013 | Soundrapandian et al. |
| 2014/0337086 A1 | 11/2014 | Asenjo et al. |
| 2016/0234239 A1 | 8/2016 | Knapp et al. |
| 2017/0034193 A1 | 2/2017 | Schulman et al. |
| 2017/0053224 A1 | 2/2017 | Duca et al. |

COGEN-MOM INTEGRATION USING TABULATED INFORMATION RECOGNITION

TECHNICAL FIELD

This disclosure relates to integrating Process Automation Systems (PASs) and, more specifically, to secure integration of Cogeneration (Cogen) systems and secure integration of Manufacturing Operations Management (MOM) systems using tabulated information recognition.

BACKGROUND

Until the 1980's, industrial automation systems (also referred to as Operational Technology (OT)) have been isolated from other networks or systems due to the critical role in monitoring and operating the plant's processes. Since the 1990's, increasing number of industrial automations systems have been interconnecting with the Information Technology (IT) (such as, creating IT/OT convergence) to provide improved decision making capability, plant efficiency optimization, and low operational cost. IT/OT convergence refers to the integration of IT systems (such as, computers, networking, communication, and information storage devices) with OT systems (such as, databases, analysis tools, and decision support systems that can be used to monitor events, processes, controllers and field instruments) for plants optimization and efficiency. Cogeneration plant and MOM applications are applications that can facilitate IT to provide integrated features to increase plant efficiency and optimization.

SUMMARY

The present disclosure describes methods and systems, including computer-implemented methods, computer program products, and computer systems for integrating third party automation systems, by outputting process values of a cogeneration power plant or refinery's blending recipes to the plant's Distributed Controls System (DCS) in addition to providing "intelligent" decision making actions based on risk level calculation. One computer-implemented method includes calculating, by at least one of a first device and a second device, a risk level, and controlling, by the at least one of the first device and the second device, a switch based on the risk level. If the risk level is less than a predetermined value, the switch is controlled to power on an image display and capturing device. Data is displayed by the first device and received by the second device through visual recognition on the image display and capturing device. If the risk level is not less than the predetermined value, the switch is controlled to power off the image display and capturing device. Data transfer from the first device to the second device through visual recognition on the image display and capturing device is stopped.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each, optionally, include one or more of the following features, alone or in combination:

A first aspect, combinable with the general implementation, comprising generating, on behalf of control systems, actions for improved decision making and normalization of plant operation, wherein the image display and capturing device is a tabulated image display and capturing device.

A second aspect, combinable with any of the previous aspects, wherein the data are process variables, the method further comprising receiving, by the second device and from a system, a data request, transmitting, by the second device and to the first device, the data request, obtaining, by the first device and from a third party system, the requested data, wherein obtaining the requested data includes extracting the process variables from the third party system, and transmitting, by the first device and to the second device, the requested data through tabulated visual recognition on the image display and capturing device.

A third aspect, combinable with any of the previous aspects, further comprising before transmitting, by the first device and to the second device, the requested data through tabulated visual recognition on the image display and capturing device, authenticating the second device by the first device.

A fourth aspect, combinable with any of the previous aspects, wherein the third party system is a cogeneration power plant and the system is a process plant's Distributed Controls System (DCS).

A fifth aspect, combinable with any of the previous aspects, wherein the third party system is a Manufacturing Operations Management (MOM) system and the system is a refinery automation system.

A sixth aspect, combinable with any of the previous aspects, wherein the risk level is associated with cyber security.

A seventh aspect, combinable with any of the previous aspects, wherein the data is displayed by the first device in a tabular form and received by the second device through Tabulated Imaging Recognition (TIR) on the image display and capturing device.

An eighth aspect, combinable with any of the previous aspects, wherein the data is displayed as a tabulated image based on a predetermined mathematical formula.

A ninth aspect, combinable with any of the previous aspects, wherein the data is displayed based on a rotating image overlay method, the rotating image overlay method includes at least one of clockwise rotating overlay, counter clockwise rotating overlay, and rotating overlay with blind spot, and the rotating image overlay method is performed based on a synchronization clock.

A tenth aspect, combinable with any of the previous aspects, further comprising controlling field instruments to place breaker control on standby mode if the risk level is not less than the predetermined value.

An eleventh aspect, combinable with any of the previous aspects, wherein calculating the risk level includes performing security assessment based on information from at least one of a firewall, an Intrusion Prevention System (IPS), an Intrusion Detection System (IDS), and a Security Incident and Event Management (SIEM) platform.

A twelfth aspect, combinable with any of the previous aspects, wherein the first device, the second device, the image display and capturing device, and the switch are part of an integration device.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the following description. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
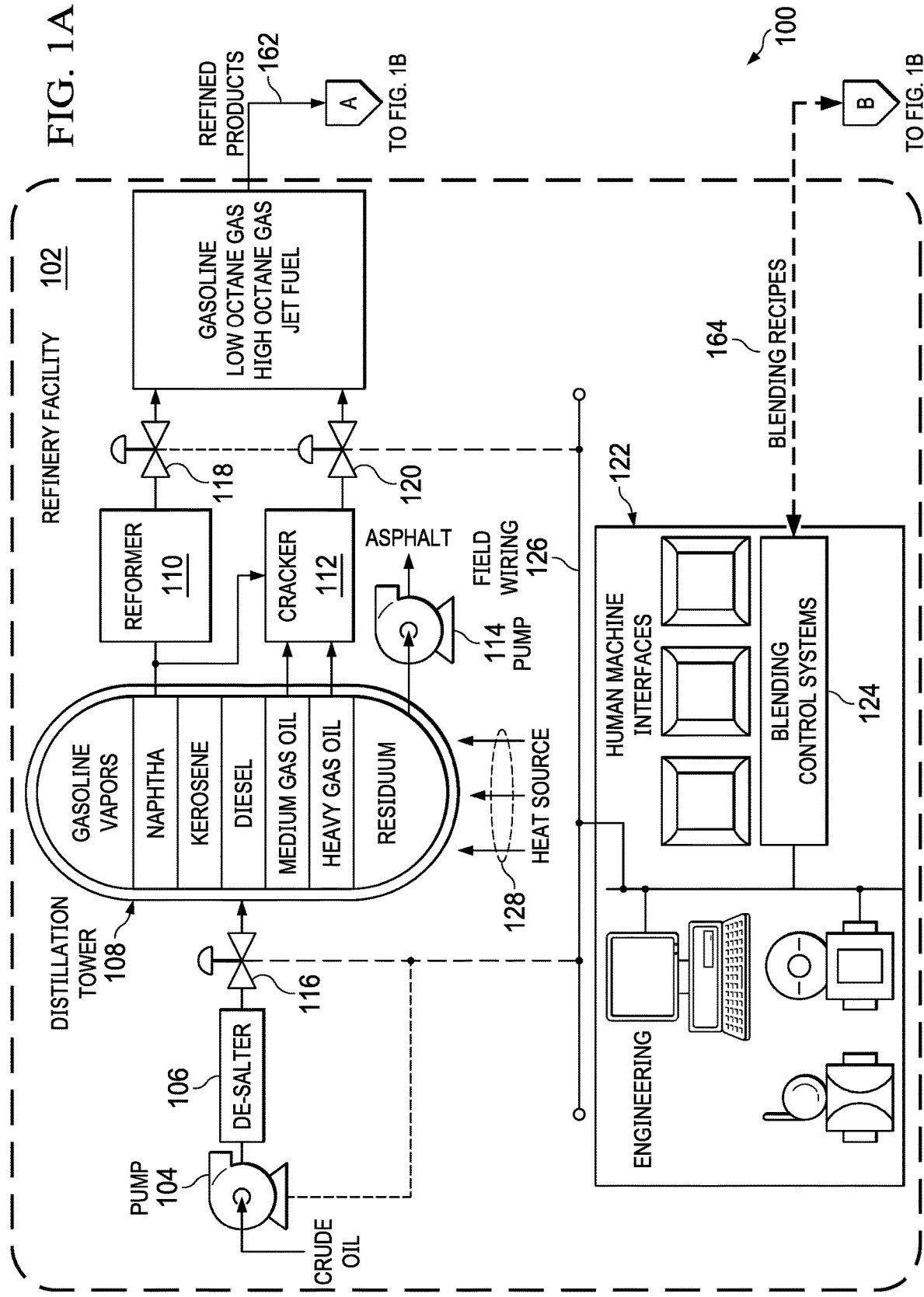
FIG. 1 is a block diagram illustrating an example interaction environment for integrating Manufacturing Operations Management (MOM) components with a refinery automation system, according to some implementations.

The following detailed description describes a method to integrate third party automation systems and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

A control system includes, for example, a control network, multiple controllers (such as, Programmable Logic Controllers (PLCs)), and multiple interconnected field devices. In general, an Industrial Control System (ICS) can be a collection of electronic equipment, which include a computer-based controller that is used to monitor, control, or monitor and control the operation of one or more of processes, relays, meters, and transducers. ICS can include, for example, Process Automation System (PAS), Distributed Control System (DCS), Emergency Shutdown System (ESD), Supervisory Control and Data Acquisition (SCADA) system, and Terminal Management System (TMS). For example, PAS can include one or more of internal interface, human interface, network interface, and machine interface. The interfaces are used to provide one or more of control, safety, maintenance, quality assurance, and other process operation functionalities to one or more of continuous, batch, discrete, and combined processes. In general, components, network equipment, and server(s) of an ICS are based on open standard architecture, which can impose security challenges to the ICS, especially when interfacing to third party PAS such as Cogen and MOM.

At a high level, the described approach provides a method and an integration device to integrate third party automation systems, such as integrating process values of a cogeneration power plant or MOM with the plant's DCS based on dynamic risk level calculation. The integration device is an application aware device that interconnects two or more systems at the data transmission and application levels. For example, process values (such as, load parameters on a cogeneration plant, blending optimization figures generated by Integrated Refinery Information System (IRIS) for MOM) can be transferred between the two or more systems through recognition of revolving visual tables when the calculated risk level is within a normal range. As a result, the integration device can eliminate legacy network connections between, for example, Cogeneration (Cogen) and plant DCS systems. In addition, the integration device includes a multi-port risk calculation engine used to generate and engage actions for improved decision making. The multi-port risk calculation engine calculates a risk level continuously, and controls a soft switch based on the calculated risk level. Depending on the calculated risk level, the soft switch can control process values transfer between the two or more systems, or generate on behalf of the control systems (such as, PLC) decision making actions through the integration device. Since the integration device uses visual recognition of process variables, instead of transferring data in its original format (such as files), only process variables (such as characters) are transferred over, thus negating the need for session-based network connections between, for example, Cogen and plant DCS systems. Upon a valid recognition, process variables are then re-constructed on the receiving side, thus providing tight integration and eliminating potential hacking and spread of malware and viruses between, for example, Cogen and plant power output systems. As a result, the integration device improves security, reliability, and availability in an ICS. Although this disclosure refers to Cogen and Manufacturing Operations Management (MOM) for purposes of example, the subject matter of this document can be applied to other applications where the required input data is to fill out the fields in a database record structure (such as, an MOM performance figure).

Figure 1B:
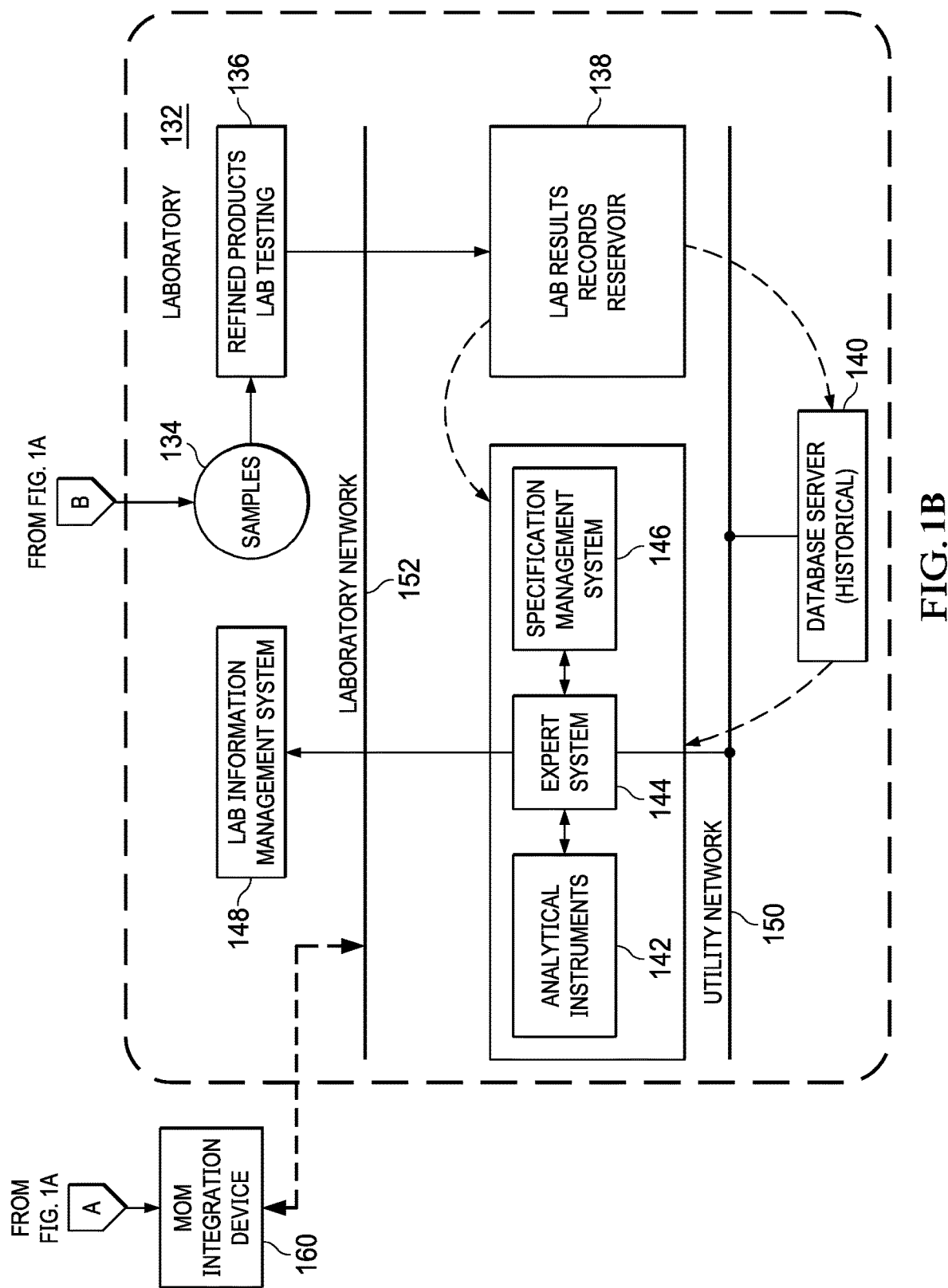

FIG. 1 is a block diagram illustrating an example interaction environment 100 for integrating Manufacturing Operations Management (MOM) components with a refinery automation system, according to some implementations. In some implementations, the interaction environment 100 may include additional or different (or a combination of both) components not shown in the block diagram. In some implementations, components may also be omitted from the interaction environment 100.

MOM is a multi-homed platform, which provides a holistic approach to manufacturing processes and can optimize overall performance of a facility (such as, a refinery facility). In an MOM system, interaction with systems (such as, Enterprise Resource Planning (ERP) systems) comes from a business network or an automation and control system. MOM can consolidate production processes to improve Quality Management (QM), Advanced Planning and Scheduling (APS), and Manufacturing Execution Systems (MES).

For example, MOM can interact with systems to support aspects of manufacturing operations, which includes ERP, Lifecycle Management (LCM), and industrial automation (such as, Integrated Refinery Information System (IRIS)). IRIS is a data system that integrates functions across the refinery business and processes to plan asset utilization, streamline operations, and performance measurement. The IRIS can streamline operations by facilitating detailed data gathering, correlation, and analysis across the refinery supply chain to boost enterprise productivity and profitability. For example, the IRIS can be used to improve refinery performance by using Reliability Driven Operator (RDO) or Economic Operator and Proactive Operator (EOPO) for timely response to abnormal operational situations. The IRIS can achieve these objectives by presenting a selective set of information from different IRIS applications to the console operator (such as, presenting on Human Machine Interfaces (HMIs)). In general, IRIS applications are placed on a business network (such as, operated by third party) because IRIS applications communicate with a SAP business module and a Laboratory Information Management System (LIMS). IRIS can utilize the connection to facilitate planning, scheduling, and blending optimization that can improve refinery output and operations. IRIS can use various optimization techniques for production planning, scheduling, and offline blending optimization to produce optimized blending recipe. The optimized blending recipe can be downloaded automatically to blending control systems as targets to improve refinery output. In addition, IRIS can provides the operator with online tracking of blending indices (such as, blending touchups) for timely responding to off-spec products and quality give-away.

As illustrated in FIG. 1, the example interaction environment 100 includes a refinery facility 102, a laboratory 132, and an MOM integration device 160. The refinery facility 102 includes two pumps 104 and 114, a de-salter 106, a distillation tower 108, a reformer 110, a cracker 112, three valves 116, 118, and 120, Human Machine Interfaces (HMIs) 122, and blending control systems 124. Connected through field wiring 126, the blending control systems 124 can control the refinery process in the refinery facility 102 by controlling, for example, the pump 104, the three valves 116, 118, and 120, and a heat source 128 to the distillation tower 108. The laboratory 132 includes samples 134, a refined products lab testing 136, a lab results records reservoir 138, a database server 140, analytical instruments 142, an expert system 144, a specification management system 146, a Lab Information Management System (LIMS) 148, a utility network 150, and a laboratory network 152.

As illustrated in FIG. 1, the MOM integration device 160 is added between the refinery facility 102 and the laboratory 132. The MOM integration device 160 insures that MOM modules are fully integrated with each other while maintaining security and reliability of the whole system. Refined products 162 from the refinery facility 102 are fed to the laboratory 132 for analysis. In some implementations, the MOM integration device 160 is configured to process values (such as, blending recipes 164) securely from the laboratory network 152 of the laboratory 132 to the blending control systems 124 of the refinery facility 102. In doing so, the blending control systems 124 can control the refinery process in the refinery facility 102 based on the blending recipes 164. To reduce cybersecurity risk imposed by interconnecting MOM components (such as, the laboratory 132) and the plant facility (such as the refinery facility 102), the MOM integration device 160 can include a visual object recognition device to obtain a 100% physical air gap between the MOM components and the plant facility. In doing so, MOM components can be safely integrated with the refinery automation system through the MOM integration device 160.

In some implementations, the integration of laboratory data from the LIMS 148 to online blending analyzers includes validating the online blending analyzers by correcting the bias and drifts in the online blending analyzers. For example, the MOM integration device 160 can be configured to use information relayed from the LIMS 148 to reduce off-spec blends and quality give-away by providing the accurate and optimized information to the blending control systems 124.

In some implementations, the MOM integration device 160 can be configured to transfer movement orders for product transfer, shipment, and blending from a scheduling system to a movement order management module in an oil movement system automatically. For example, an IRIS scheduling system can be placed on a business network because of the needs to integrate with SAP (such as, finished products prices, intermediate product prices, blending components cost) as well as several other IRIS systems (such as, a planning system, a reconciliation system, a LIMS, and a Plant Information (PI) system). The movement order management module can be part of the oil movement system in a refinery network because of the tight integration with the DCS. The automation of the movement orders reduces human error, and provides a tank farm console cooperator with the lifecycle of the blend (that is, from start to stop) by online tracking (such as, additional alarms) of the quantity and time to execute the movement. The completed movement orders are prerequisites for establishing refinery-wide mass balance for production accounting and hydrocarbon losses identification. As a result, refinery-wide mass balance can be implemented by the automation of the movement orders through the MOM integration device 160.

In some implementations, the IRIS can use the MOM integration device 160 in measurement data validation and reconciliation. For example, an IRIS reconciliation system can calculate validated value and confidence level of field instruments conveyed by the MOM integration device 160. Displaying the validated value and confidence level of field measurements (such as, unit charge and product flow meters) on an operator's console can support the decision of the operator and increase the operator's level of confidence to move the process into the right direction.

In some implementations, the IRIS can use the MOM integration device 160 to provide asset monitoring for operations within a performance and integrity envelop. Displaying deviation alarms on an operator's console can support proactive operation for timely managing and deviations from optimum production plan (or schedule) and integrity limits.

In some implementations, the IRIS can use inputs from the MOM integration device 160 to provide real time economics analysis for the main business driers of the plant (such as, energy, production quantity of process units). Displaying the economics analysis information in real time on an operator's console can provide the operator with visibility on the impact of the operator's actions on the economics of the refinery.

In some implementations, the IRIS can provide soft sensors values from the MOM integration device 160 for predicting emissions from field equipment. The predicted emissions information is displayed on an operator's console (such as, an HMI of a continuous emission monitoring system). The displayed information provides the console operator with insight about the emissions when hardware analyzers drift or are offline for calibration.

The MOM integration device 160 not only facilitates data exchange between the main plant process control network and those of the MOM, but also provides tight integration with the plant control systems. The integration allows the system to trigger actions or outputs (or a combination of both) for improved decision making and an efficient mode of operation for the plant. For example, blending optimization parameters are outputted from the LIMS 148, and are normally fed into the blending control systems 124. As illustrated in FIG. 1, the MOM integration device 160 is added between the LIMS 148 and the blending control systems 124. As a result, depending on a calculated risk level, the blending control systems 124 can be diverted to operate on "virtualized" figures predicted by the MOM integration device 160 (such as, using values learned previously through past experiences or articulated by neural network).

Figure 2:
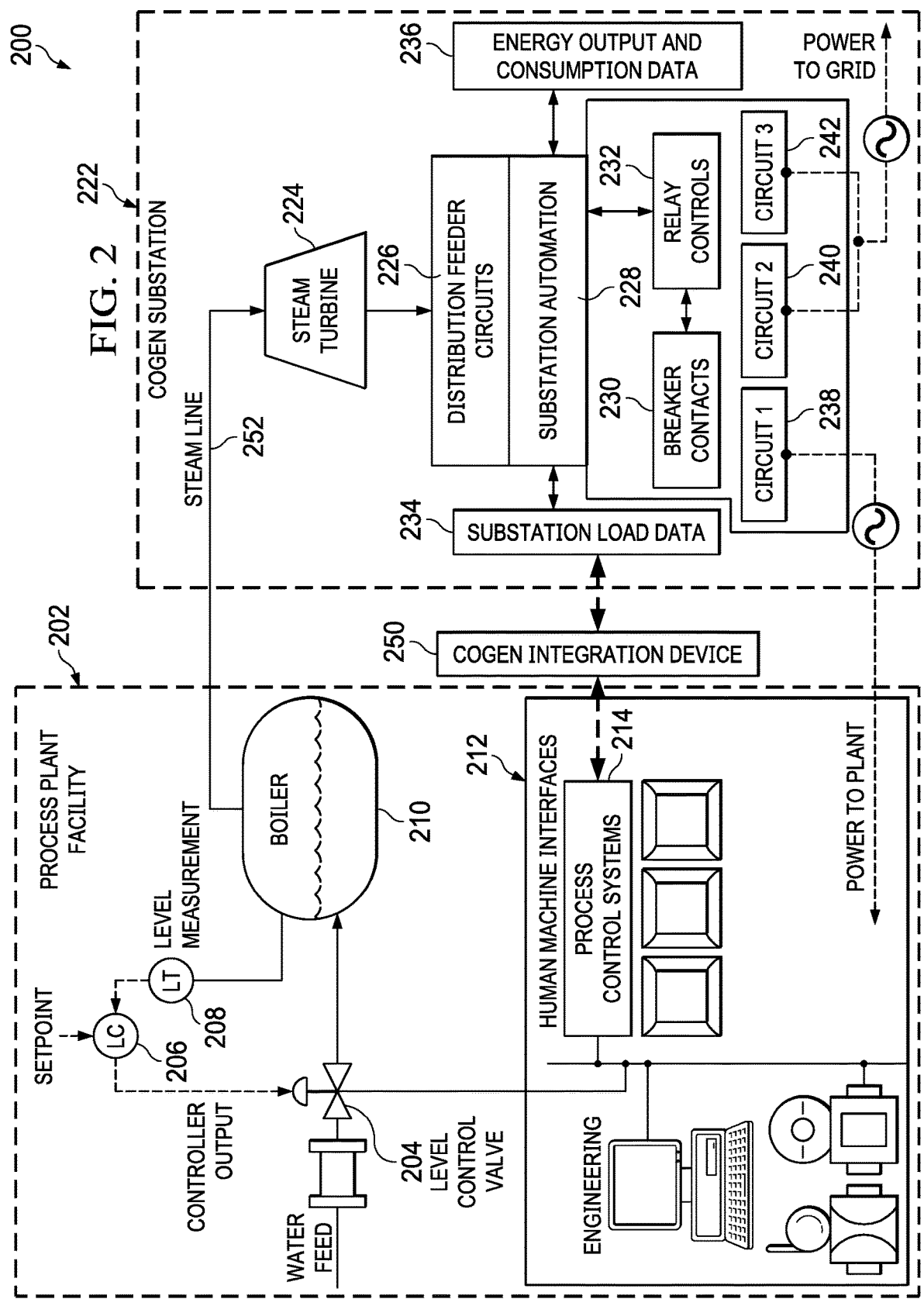
FIG. 2 is a block diagram illustrating an example interaction environment for integrating output process values of a cogeneration power plant with the plant's Distributed Controls System (DCS), according to some implementations.

FIG. 2 is a block diagram illustrating an example interaction environment 200 for integrating output process values of a cogeneration power plant with the plant's Distributed Controls System (DCS), according to some implementations. In some implementations, the interaction environment 200 may include additional or different (or a combination of both) components not shown in the block diagram. In some implementations, components may also be omitted from the interaction environment 200.

Cogeneration facilities are built to utilize a plant product (such as, steam) to generate electricity. The generated electricity can be used by the plant facility itself or sold to the local power grid. In general, a cogeneration (Cogen) plant includes primary components and subordinate components. For example, the primary components of a Cogen plant include a Cogen substation at the cogeneration plant facility, and a number of distribution feeder circuits connected to customer plant site substations or national power grid (or a combination of both). The subordinate components of a Cogen plant include breakers, structural steel and insulations, relay control boards, transformers, and power circuit breaker contacts. The Cogen substation can provide continuous uninterrupted service, and use dual or redundant lines to interconnect with local customer's power inputs. Cogen automation systems can use microprocessor based protective relaying and control systems to communicate with substation control system. The substation control system can include controllers (such as, PLCs) to provide opening, closing, status, and alarm signals. In addition, the operator interface can include a gateway to the plant process DCS and custom graphics. Microprocessor based metering systems provide continuous load data to the plant's control system, so that the load data can be effectively monitored and controlled by the plant's DCS for load optimization. As a result, the plant's DCS is able to operate the Cogen substation through, for example, breaker control switches.

Breaker control, indication, and alarming functions can be accomplished through a PLC with digital and analog I/O signal processing. In general, the PLC connects, through hardwired connections, to automatic synchronizing equipment in a Cogen plant for energy monitoring. For example, energy output and energy consumption can be monitored through direct input from distribution line meters. Input signals (such as, instantaneous current, voltage, watt) are fed to the PLC from transducers in protective relay panels. A remote I/O rack can carry breaker status, monitoring, and line metering functions information back to the DCS.

As illustrated in FIG. 2, the example interaction environment 200 includes a process plant facility 202, a cogeneration substation 222, and a Cogen integration device 250. The process plant facility 202 includes a level control valve 204, a level controller (LC) 206, a level measurement (LT) 208, a boiler 210, Human Machine Interfaces (HMIs) 212, and process control systems 214. The process control systems 214 can control the process in the process plant facility 202 by controlling, for example, the level control valve 204. The cogeneration substation 222 includes a steam turbine 224, distribution feeder circuits 226, substation automation 228, breaker contacts 230, relay controls 232, substation load data 234, energy output and consumption data 236, circuit 1 238, circuit 2 240, and circuit 3 242. The circuit 1 238 can provide power to the process plant facility 202. The circuit 2 240 and the circuit 3 242 can provide power to the power grid.

As illustrated in FIG. 2, the Cogen integration device 250 is added between the process plant facility 202 and the cogeneration substation 222. The Cogen integration device 250 insures that the cogeneration substation 222 and the process plant facility 202 are fully integrated with each other while maintaining security and reliability of the whole system. Steam line 252 connects the boiler 210 of the process plant facility 202 to the steam turbine 224 of the cogeneration substation 222 to generate power. In some implementations, the Cogen integration device 250 is configured to transfer information (such as, the substation load data 234) securely from the cogeneration substation 222 to the process control systems 214 of the process plant facility 202. In doing so, the process control systems 214 can control the process in the process plant facility 202 based on the substation load data 234. To reduce cybersecurity risk imposed by interconnecting the cogeneration substation 222 and the process plant facility 202, the Cogen integration device 250 can include a visual object recognition device to obtain a 100% physical air gap between the cogeneration substation 222 and the process plant facility 202. In doing so, breaker control, indication, and alarming functions, as well as power output and power consumption can be safely monitored through visual recognition of displayed information.

In some implementations, the Cogen integration device 250 can be configured to make intelligent decision on controlling circuit breaker (such as, whether to leave the circuit open or to close the circuit). Once a potential risk level is detected, the Cogen integration device 250 can allow a reaction time-out (such as, a time-out with a user configurable duration). During the reaction time-out, system administrator can exercise a number of options (such as, risk investigation, invoking an immediate action). The reaction time-out can be implemented by special circuitry (such as, standby mode) that can be added to the breaker control or through software on the Cogen integration device 250. For example, implementing through software on the Cogen integration device 250, the reaction time-out can be supported in legacy circuit breaker systems.

The Cogen integration device 250 not only facilitates process values exchange between the main plant process control network and those of the Cogen, but also provides tight integration with the plant control systems. The integration allows the system to trigger actions, outputs, and results in improved decision making and efficient mode of operation of the plant. For example, load signals (such as, current, volts, and watts) outputted from transducers are normally fed into a Programmable Logic Controller (PLC). The PLC then passes a control logic (such as, switching a circuit, issuing a load balance) to breaker control systems. As illustrated in FIG. 2, the Cogen integration device 250 is added between the PLC and the breaker control systems. As a result, depending on a calculated risk level, the breaker control systems can be put on an "alert" or "standby" status with a timeout to shutoff the circuit if an administrator does not intervene. In doing so, security features can be integrated into a legacy breaker control system logic without changing the legacy system.

Figure 3:
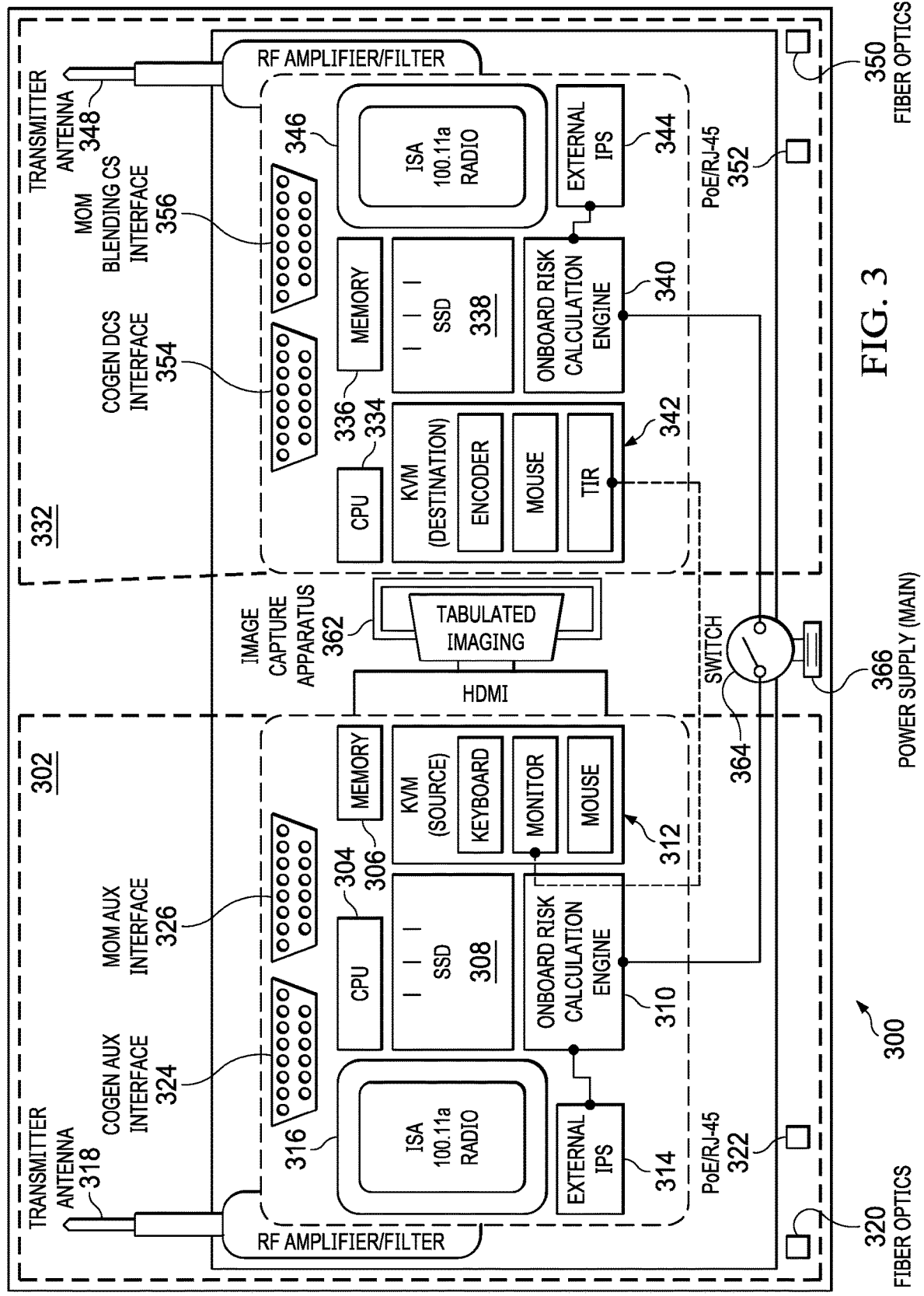
FIG. 3 is a block diagram illustrating an example integration device for integrating Cogeneration (Cogen) systems or MOM systems, according to some implementations.

FIG. 3 is a block diagram illustrating an example integration device 300 for integrating Cogeneration (Cogen) systems or MOM systems, according to some implementations. In some implementations, the example integration device 300 may include additional or different (or a combination of both) components not shown in the block diagram. In some implementations, components may also be omitted from the example integration device 300.

As illustrated in FIG. 3, the example integration device 300 includes device a 302, device b 332, an image capturing device 362, a switch 364, and a power supply 366. The device a 302 includes a CPU 304, a memory 306, a Solid State Drive (SSD) 308, an onboard risk calculation engine 310, a Keyboard, Video, and Mouse (KVM) 312, an external Intrusion Prevention System (IPS) 314, a radio 316, a transmitter antenna 318, a fiber optic port 320, a RJ-45 port 322, a Cogen aux interface 324, and an MOM aux interface 326. The device b 332 includes a CPU 334, a memory 336, an SSD 338, an onboard risk calculation engine 340, a KVM 342, an external IPS 344, a radio 346, a transmitter antenna 348, a fiber optic port 350, a RJ-45 port 352, a Cogen DCS interface 354, and an MOM blending control systems interface 356. The switch 364 can be controlled by the onboard risk calculation engine 310, the onboard risk calculation engine 340, or a combination of both. The switch 364 can control, for example, power to the image capturing device 362.

As illustrated in FIG. 3, the example integration device 300 includes a number of security components (such as, the onboard risk calculation engine 310, the onboard risk calculation engine 340). In some implementations, system process workflow (such as, risk level workflow) is generated and fed to the onboard risk calculation engine 310 on the device a 302 (that is, a sending device) and the onboard risk calculation engine 340 on the device b 332 (that is, a receiving device). Each of the onboard risk calculation engine 310 and the onboard risk calculation engine 340 can calculate a risk level and control the data transfer connection between the device a 302 and the device b 332. For example, if the calculated risk level is below a predetermined value, the onboard risk calculation engine 310 or the onboard risk calculation engine 340 can control the switch 364 to power on the image capturing device 362 so that displayed data (such as, load parameters on a cogeneration plant, blending optimization figures generated by IRIS for MOM) by the device a 302 can be transferred to the device b 332 through visual recognition. If the calculated risk level is above the predetermined value, the onboard risk calculation engine 310 or the onboard risk calculation engine 340 can control the switch 364 to power off the image capturing device 362 so that data transfer from the device a 302 to the device b 332 through the image capturing device 362 is stopped. In some implementations, the risk level can be displayed on, for example, HMIs as an operational alarm when a predefined tag value is met or surpassed. In addition, the risk level can be transferred, for example, as a Simple Network Management Protocol (SNMP) to a central Network Management Station (NMS). A dashboard can reflect dynamic indicators quantifying the risk level, which executive management personal can track and act on. In some implementations, the workflow and calculation process can be programmed in a separate Integrated Circuit (IC) onboard the example integration device 300. The example integration device 300 can communicate with an ICS using TCP/IP, SNMP, and industrial protocols (such as, Modbus, DNP3, OPC).

In some implementations, each of the onboard risk calculation engines 310 and 340 can include an internal component, an external component, and a reporting component. For example, the internal component can be based on an internal risk calculation subroutine that uses an embedded self-assessment process (described in detail in FIG. 4). The external risk calculation component can be connected to other security appliances (such as, Intrusion Prevention System (IPS), Security Incident and Event Management (SIEM)). The external component can use other company cyber security (such as, technical security alerts) as a source for a risk calculation engine. In doing so, an emerging threat that is not captured by legacy cyber security systems can be taken into consideration when calculating the risk value. The combined outcome of both the internal and external risk inputs is fed into the risk calculation engine, which drives a soft switch controlling the communication of the example integration device 300. The reporting component can generate reporting files or traps to be communicated using, for example, OPC or SNMP. The reporting files can be extensible markup language (XML) files or other files that can be accessed by other company solutions. For SNMP traps, special Management Information Block (MIB) fields can be devised to reflect asset management status with alerts, as shown in Table 1.

TABLE 1

| Indicator | SNMP Trap | Value |
| --- | --- | --- |
| Green | 95% discrepancy is observed for the past 6 months or more | ≥85% |
| Amber | Discrepancy attention. Some issues still unresolved | <84% |
| Red | Severe discrepancies observed | <29% |

In Table 1, the MIBs information can be automatically gathered by a standard Network Management Station (NMS), thus eliminating the need to have a separate monitoring and alerting system. In addition, the reporting capability can be extended to operators' workstation on a DCS or a SCADA to determine if further action is needed.

In some implementations, the device a 302 is connected to a Cogen plant through the Cogen aux interface 324 and the device b 332 is connected to the plant's DCS through the Cogen DCS interface 354. In some implementations, the device a 302 is connected to MOM components through the MOM aux interface 326 and the device b 332 is connected to a refinery automation system through the MOM blending control systems interface 356. The connections can use TCP/IP or any other appropriate protocols. In some implementations, the device a 302 and the device b 332 are connected through the image capturing device 362 to obtain a 100% physical air gap between the device a 302 and the device b 332. In some implementations, an optional digital transfer connection can be established between the KVM 313 of the device a 302 and the KVM 342 of the device b 332.

In some implementations, the operational flow of data is initiated from the plant side (such as, the Plant's DCS) by sending a request for power output data generated by Cogen metering systems and transducers. The device a 302 can determine, for example, table format, table rotation cycle, and projection frames per second to be displayed for the image capturing device 362. The device b 332 can interpret the service request sent by the plant's DCS, re-construct data displayed by the device a 302, and package information tables complying with the service request. In some implementations, rotating overlay (or mask) with a synchronized clock is used to ensure validity and originality of the transferred data. For example, both the device a 302 and the device b 332 can be wired or wirelessly connected to a synchronization clock (described in detail in FIGS. 12 and 13).

In some implementations, Cogen load data can be captured (such as, by a normal Optical Character Recognition (OCR) apparatus fitted to the top of the monitor) from screen images of a display terminal connected to the Cogen system. Similarly, MOM's laboratory mixing data can be captured from screen images of a display terminal connected to the MOM system. Alternatively, screenshot (or a screen grab) from either systems can be obtained using software (such as, a digital image of what is visible on a visual output device, for example, a monitor). Once captured in abstract format, the process values are then encoded in Tabulated Imaging Recognition (TIR) format as per a construction formula. Repetitive rolling screenshots can be created by system controlled page parsing. In some implementations, a screenshot (or screen capture) can be created by taking a photo of the screen.

In some implementations, visual (or optical) objects of information (such as, tables holding information related to Asset Inventory, Life Cycle Management, or Security Compliance reports) can be encoded using Tabulated Imaging Recognition (TIR). For example, TIR can use dimension analysis on a multitude of parameters (such as, number of fields in a table, the fields' respective height and width compared to the size of the table, font size, line spacing, and margins) to determine authenticity and validity of a projected table and information included in the table. TIR focuses on structural analysis to validate an object, rather than information within the object. As a result, an optical object is arranged according to a predefined mathematical relationship in order to be successfully recognized. For example, images with inner objects that are arranged and positioned in a particular ration can be recognized. Once an image is recognized, a subordinate function (such as, Optical Character Recognition (OCR)) can be used to verify numbers, letters, and other characters in the image, and convert them into digital output. For example, number of characters in a table (nct) can be verified by:

$$nct = \frac{-Sg \pm \sqrt{(Lb)Sp^2 - 4WLR}}{2CsSr + PFS} \quad (1)$$

Where Sg is segmentation, Sp is separators, Lb is labeling, WLR is width to length ratio, CsSr is character size to spacing ratio, and PFS is projected frame sequence.

In some implementations, hardware whitelisting can be implemented as a self-protection mechanism for the example integration device 300. For example, each hardware component (such as, CPU, memory, each network interfaces) is assigned with a hardware digital ID. Communications sent from a hardware component is signed with the hardware's digital ID. Communications received from a hardware component is verified against the hardware's digital ID. In doing so, intervention or manipulation with hardware components can be prevented.

In some implementations, software whitelisting can be implemented as another self-protection mechanism for the example integration device 300. For example, each software component (such as, Operating System (OS), applications plugins, network drivers) can be digitally identified and verified. In doing so, intervention or manipulation with software components can be prevented.

In some implementations, a built-in methodology to protect against device tampering is to install a protective seal on a box of the example integration device 300. For example, the seal is electronically guided and operated. When the seal is broken (such as, opening the box), a flag (such as, an electronic signal) is sent to, for example, a hardware whitelisting subroutine. The seal logic and mechanism can be powered by an internal battery to ensue continuous operations, even if the example integration device 300 is unplugged from power outlet.

In some implementations, a built-in anomaly-based Intrusion Detection System (IDS) or Intrusion Prevention System (IPS) can be implemented as another self-protection mechanism for the example integration device 300. For example, the IDS or IPS can monitor system activities, and categorize a particular activity as either a normal activity or an abnormal activity. In doing so, the IDS or IPS can detect system intrusions when abnormal activities are detected. The IDS or IPS can use a neural network to learn and store patterns of acceptable system behavior, and can proactively stop traffic upon detection of suspicious behavior.

In some implementations, a built-in on/off switch can be implemented as another self-protection mechanism for the example integration device 300. For example, the built-in on/off switch can control remote access and configuration of the example integration device 300 using SSH and HTTPS. In doing so, the example integration device 300 can be protected once fully configured. For example, when the switch is in an off position, the example integration device 300 does not accept a network based management request.

In some implementations, the example integration device 300 can implement a dual bus architecture to enhance system availability and reliability. For example, the dual bus architecture can include two devices (such as, two CPUs, two memories) working as one with a built-in synchronizing circuit.

In some implementations, data buffering and compression can enhance system efficiency. For example, the system can include a self-restoration subroutine. When system configuration is lost or damaged, the self-restoration subroutine can restore the system from a backup point stored on a flash memory or a network storage location. In addition, the system can operate on a pre-configured schedule coherent with Cogen and plant DCS working schedule. In doing so, communication link usage can be optimized, and cybersecurity can be enhanced since the system will be mostly off during a twenty-four hour period.

In some implementations, weather proof and vandal proof housing can be provided when installing the example integration device 300 in outdoor or hostile environment. Sturdy mount can be provided for outdoor installation to avoid potential vibration to the device. System mount can be designed to support maximum weight of the system and enclosure assemblies. Stainless steel NEMA Type 4X or IEC 60529 Type IP66 enclosures (or housing) can be used to protect device in severe corrosive environment. In addition, grounding terminal can be supported by the system.

In some implementations, the example integration device 300 can include a two-piece encoder/decoder combination with interfaces shown in Table 2 and Table 3.

TABLE 2

Hardware

| Category | Components |
|---|---|
| Network | Ethernet RJ-45, Single mode/Multimode and Single mode Fiber Optic/Ethernet over Powerline |
| Power | External power supply—Onboard Battery—PoE, Power over Ethernet |
| Security | Hardware Whitelisting/Security seal/Digitally Signed Hardware Components |
| Computing | CPU, Memory, Communication Bus |

TABLE 3

Software

| Category | Components |
|---|---|
| Applications | OS, Application Programmable Interface (API), Management and Diagnostics Engine |
| Protocols | TCP/IP Stack, 802.1q, 802.1x, SNMP v3 |
| Security | Host Intrusion Prevention System (HIPS), Application Whitelisting, SSH, HTTPS, Security Certificates, Syslog |
| Computing | CPU, Memory, Communication Bus |
| Digital Signal Processing | Encoding/Decoding Engine |
| Performance and Health | Resource utilization reporting; % available CPU; % available Memory; Processor temperature |

Figure 4:
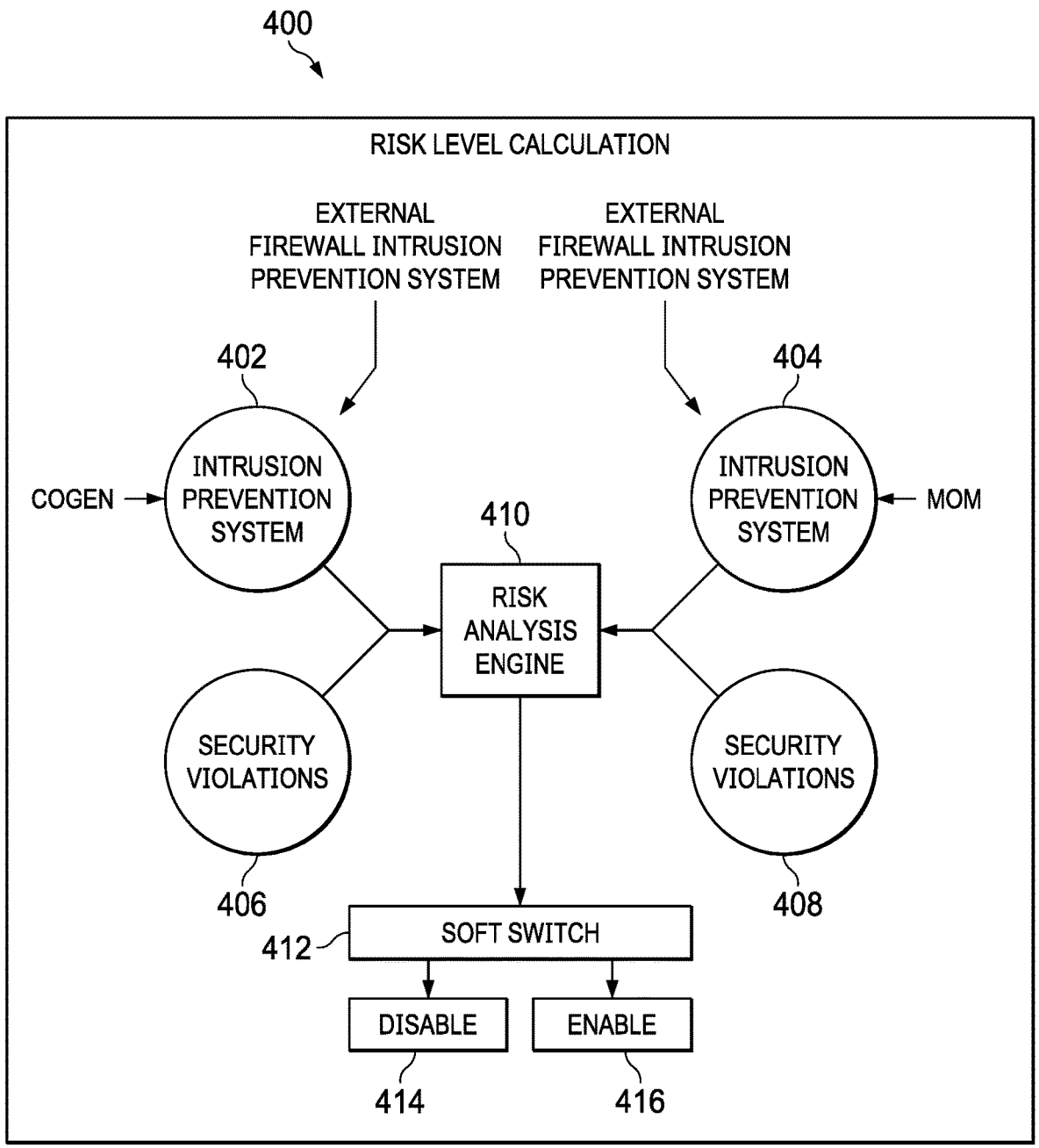
FIG. 4 is a block diagram illustrating an example flow of risk level calculation, according to some implementations.

FIG. 4 is a block diagram illustrating an example flow 400 of risk level calculation, according to some implementations. As discussed in FIG. 3, an internal component of an onboard risk calculation engine is based on an internal risk calculation subroutine that uses an embedded self-assessment process. The primary purpose for the self-assessment is to measure current adherence to the security policy, and generate a list of policy violations. The list of policy violations can then be used to generate a risk level, which is fed to the risk level calculation to determine a risk level rating based on a configurable threshold.

As illustrated in FIG. 4, the example flow 400 includes two IPSs 402 and 404, a risk analysis engine 410, and a soft switch 412. In some implementations, external Cogen risk is inputted through the IPS 402, and internal risk is calculated at security violations 406. Both the calculated internal risk and the external Cogen risk are fed into the risk analysis engine 410 to calculate a risk level. The risk analysis engine 410 drives the soft switch 412, based on the calculated risk level, to disable 414 (such as, leave the switch open) or enable 416 (such as, close the switch) communications between two systems. Similarly, external MOM risk is inputted through the IPS 404, and internal risk is calculated at security violations 408. Both the calculated internal risk and the external MOM risk are fed into the risk analysis engine 410 to calculate a risk level. The risk analysis engine 410 drives the soft switch 412, based on the calculated risk level, to disable 414 (such as, leave the switch open) or enable 416 (such as, close the switch) communications between two systems.

In some implementations, the risk level can be calculated by subtracting a percentage of policy violations from a full compliance to the security policy (such as, a 100 percent compliance). The calculation logic can be embedded in an onboard chip supporting multiple protocols (such as, TCP/IP, SNMP, Modbus, and DNP3). In addition, the calculation logic with integrated security features can provide integrated risk level value. In some implementations, the integrated security component can communicate with a DCS, a SCADA, or other control systems.

Table 4 shows one example of risk level calculation. As shown in Table 4, three risk level ratings (that is, high, medium, and low) are determined. For example, if the number of violations is greater than or equal to 50% compliance, the risk level rating is determined to be high. If the number of violations is between 30% compliance and 50% compliance, the risk level rating is determined to be medium. If the number of violations is less than or equal to 30% compliance, the risk level rating is determined to be low.

TABLE 4

| Level determination | Rating |
|---|---|
| Number of violations ≥ 50% | High |
| 50% > Number of violations > 30% | Medium |
| Number of violations ≤ 30% | Low |

In some implementations, the internal component of the onboard risk calculation engine can include a Self-Assessment Engine (SAE) and a Security Baseline Database (SBD). For example, the SAE can query ICS computers, network equipment, and controllers using TCP/IP, SNMP, and industrial protocols (such as, Modbus, DNP3, OPC). Data collected from the ICS computers, network equipment, and controllers can be processed by the SAE to calculate a ratio value based on the previously-described risk level calculation. The SBD can store security policies. For example, the SBD can be connected to a control system, and serves as a standard repository. The SBD can be located on a SSD of an integration device or a separate server connected to the integration device.

Figure 5:
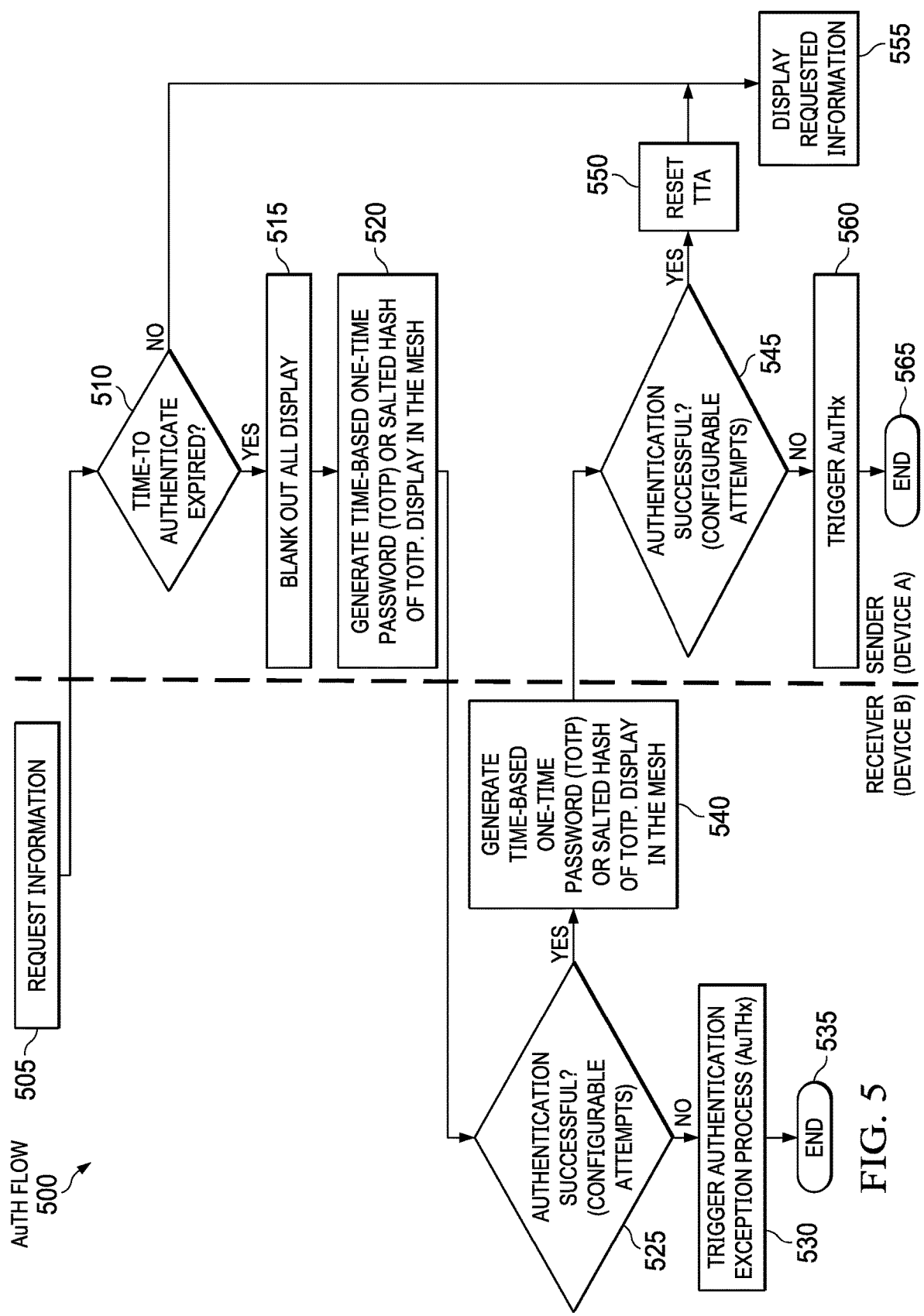
FIG. 5 is a flowchart illustrating an example method for device authentication, according to some implementations.

FIG. 5 is a flowchart illustrating an example method 500 for device authentication, according to some implementations. For clarity of presentation, the description that follows generally describes method 500 in the context of the other figures in this description. For example, method 500 can be performed by the MOM integration device 160 in FIG. 1, the Cogen integration device 250 in FIG. 2, the integration device 300 in FIG. 3, or a computer system described in FIG. 7. However, it will be understood that method 500 may be performed, for example, by any suitable system, environment, software, and hardware, or a combination of systems, environments, software, and hardware, as appropriate. In some implementations, various steps of method 500 can be run in parallel, in combination, in loops, or in any order. In some implementations, the steps of method 500 can be run automatically.

The method 500 starts at block 505 where a receiver (such as, device b 332 in FIG. 3) sends an information request to a sender (such as, device a 302 in FIG. 3). In response to receiving the information request, at block 510, the sender makes a determination on whether a Time-To-Authenticate (TTA) expires. In some implementations, the TTA can be configured by the sender, the receiver, or both the sender and the receiver. If a determination is made that the TTA has not expired, the method 500 proceeds to block 555 where the sender displays the requested information, for example, in a mesh and using a blind spot algorithm. If a determination is made that the TTA has expired, the method 500 proceeds to block 515 where both the receiver and the sender perform a re-authentication process.

At block 515, the sender blanks out all display. For example, the sender stops displaying information to the receiver. At block 520, the sender generates a Time-Based One-Time Password (TOTP) or a salted hash of the TOTP, and displays the TOTP or the salted hash in a mesh (such as, a rotating overlay mesh) to the receiver. In some implementations, the TOTP is a short-lived one-time password. A standard application of RFC 6238 can produce a secured TOTP. To enhance security, a salted hash of the TOTP, instead of the TOTP, can be displayed. For example, the salted hash can use National Institute of Standards and Technology (NIST) approved Pseudo-Random Number Generator (PRNG) and NIST approved Simple Hash Algorithm (SHA). In some implementations, the TOTP can be displayed using the same mesh and blind spot algorithm used in displaying the requested information. One the receiver recognizes the displayed TOTP or the displayed salted hash, the receiver can authenticate the code based on, for example, a previously configured algorithm, shared secret, and the current time.

At block 525, the receiver makes a determination on whether the authentication is successful. If a determination is made that the authentication is not successful, at block 530, the receiver triggers an authentication exception process (AuTHx), and the method 500 stops at block 535. In some implementations, the authentication can be performed for a configurable number of attempts before determining that the authentication is not successful and triggering the AuTHx. In some implementations, a risk-based error handling process can be applied to handle the AuTHx.

If a determination is made that the authentication is successful, at block 540, the receiver generates a TOTP or a salted hash of the TOTP, and displays the TOTP or the salted hash in a mesh (such as, a rotating overlay mesh) to the sender. In some implementations, the TOTP is a short-lived one-time password. A standard application of RFC 6238 can produce a secured TOTP. To enhance security, a salted hash of the TOTP, instead of the TOTP, can be displayed. For example, the salted hash can use NIST approved PRNG and NIST approved SHA. In some implementations, the TOTP can be displayed using the same mesh and blind spot algorithm used in displaying the requested information. One the sender recognizes the displayed TOTP or the displayed salted hash, the sender can authenticate the code based on, for example, a previously configured algorithm, shared secret, and the current time.

At block 545, the sender makes a determination on whether the authentication is successful. If a determination is made that the authentication is not successful, at block 560, the sender triggers an AuTHx, and the method 500 stops at block 565. In some implementations, the authentication can be performed for a configurable number of attempts before determining that the authentication is not successful and triggering the AuTHx. In some implementations, a risk-based error handling process can be applied to handle the AuTHx. If a determination is made that the authentication is successful, at block 550, the sender resets the TTA (such as, sending a signal to reset the TTA), and the method proceeds to block 555 where the sender displays the requested information to the receiver.

In some implementations, operational information (such as, the requested information) can be encoded by the sender, and validated by the receiver using, for example, a whitelist or a blacklist. Standard application security data validation techniques can be used to prevent scripting attacks or other attacks. In some implementations, the receiver does not use input data that is not encoded and validated.

In some implementations, authentication information can be transmitted in a separate channel different from the channel used to transfer the operational information. In doing so, specific and configurable management rules can be applied separately to the authentication process.

In some implementations, both the operational information and the authentication information are not displayed when the integration device is opened. The integration device can be switched, using a key, to a program (or test) mode. In the program (or test) mode, information, other than the operational information and the authentication information, can be displayed. In doing so, displayed information can help technicians troubleshoot system problems while maintaining confidentiality of the operational information and the authentication information.

The example method 500 shown in FIG. 5 can be modified or reconfigured to include additional, fewer, or different steps (not shown in FIG. 5), which can be performed in the order shown or in a different order. In some implementations, one or more of the steps shown in FIG. 5 can be repeated or reiterated, for example, until a terminating condition is reached. In some implementations, one or more of the individual steps shown in FIG. 5 can be executed as multiple separate steps, or one or more subsets of the steps shown in FIG. 5 can be combined and executed as a single step. In some implementations, one or more of the individual steps shown in FIG. 5 may also be omitted from the example method 500.

Figure 6:
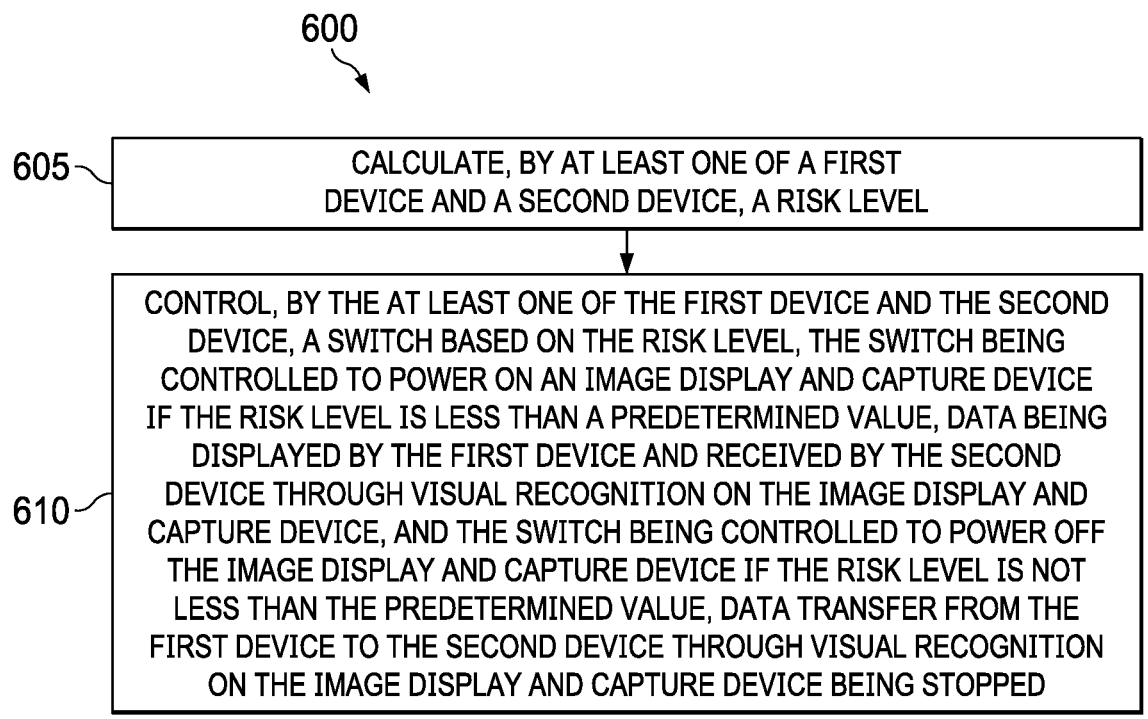
FIG. 6 is a flowchart illustrating an example method for integrating Process Automation Systems (PASs), according to some implementations.

FIG. 6 a flowchart illustrating an example method 600 for integrating Process Automation Systems (PASs), according to some implementations. For clarity of presentation, the description that follows generally describes method 600 in the context of the other figures in this description. For example, method 600 can be performed by the MOM integration device 160 in FIG. 1, the Cogen integration device 250 in FIG. 2, the integration device 300 in FIG. 3, or a computer system described in FIG. 7. However, it will be understood that method 600 may be performed, for example, by any suitable system, environment, software, and hardware, or a combination of systems, environments, software, and hardware, as appropriate. In some implementations, various steps of method 600 can be run in parallel, in combination, in loops, or in any order. In some implementations, the steps of method 600 can be run automatically.

The method 600 starts at block 605 where a risk level is calculated. The risk level can be calculated by a first device, a second device, or a combination of both the first and second devices. In some implementations, the risk level is associated with cyber security (such as, industrial cyber security of a COGEN system). In some implementations, calculating the risk level includes performing security assessment based on information from at least one of a firewall, an Intrusion Prevention System (IPS), an Intrusion Detection System (IDS), and a Security Incident and Event Management (SIEM) platform.

At block 610, a switch is controlled based on the calculated risk level. The switch can be controlled by the first device, the second device, or a combination of both the first and second devices. For example, if the calculated risk level is less than a predetermined value (such as, a low risk level rating), the switch is controlled to power on an image display and capturing device. In some implementations, the image display and capturing device is a tabulated image display and capturing device. When the image display and capturing device is powered on, data is displayed by the first device and received by the second device through visual recognition, instead of in digital format, on the image display and capturing device. In some implementations, only process values (such as, load parameters on a cogeneration plant, blending optimization figures generated by IRIS for MOM), not files, can be transferred from the first device to the second device through visual recognition on the image display and capturing device. If the calculated risk level is not less than the predetermined value (such as, a high risk level rating), the switch is controlled to power off the image display and capturing device. When the image display and capturing device is powered off, data transfer from the first device to the second device through visual recognition on the image display and capturing device is stopped. In some implementations, if the calculated risk level is not less than the predetermined value, field instruments are controlled to place breaker control on standby mode with a timeout to shutoff the circuit if an administrator does not intervene. In some implementations, the switch is controlled to power on or off only the image display and capturing device. In some implementations, data is displayed by the first device in a tabular form and received by the second device through Tabulated Imaging Recognition (TIR) on the image display and capturing device. In some implementations, data is displayed in a rotating overlay mesh or in a rotating overlay mesh with blind spots. In some implementations, the first device, the second device, the image display and capturing device, and the switch are part of an integration device.

In some implementations, a data request is received by the second device and from a system. The data request is transmitted by the second device and to the first device. The requested data (such as, process variables) is obtained by the first device and from a third party system. For example, process variables can be extracted from the third party system (such as, scanned from a display terminal of the third party system by a hardware or software scanner). The requested data is transmitted, through tabulated visual recognition on the image display and capturing device, by the first device and to the second device. In some implementations, the requested data is displayed as a tabulated image based on a predetermined mathematical formula known to both the first device and the second device. For example, the predetermined mathematical formula can define format of a table, including table dimensions, rotation angles, cell orientation, field definitions, spacing, and arrangements of table contents. In some implementations, the request data is displayed based on a rotating image overlay method. The rotating image overlay method can include at least one of clockwise rotating overlay, counter clockwise rotating overlay, and rotating overlay with blind spot. The rotating image overlay method can be performed based on a synchronization clock connected to both the first device and the second device. In some implementations, the third party system is a cogeneration power plant, and the system is a process plant's Distributed Controls System (DCS). In some implementations, the third party system is a Manufacturing Operations Management (MOM) system, and the system is a refinery automation system. In some implementations, the integration device can be part of the system, part of the third party system, or independent from the system and the third party system.

The example method 600 shown in FIG. 6 can be modified or reconfigured to include additional, fewer, or different steps (not shown in FIG. 6), which can be performed in the order shown or in a different order. For example, the second device is authenticated by the first device, before the first device transmits the requested data, through visual recognition on the image display and capturing device, to the second device. In some cases, after block 610, actions are generated, on behalf of control systems, for improved decision making and normalization of plant operation. In some implementations, one or more of the steps shown in FIG. 6 can be repeated or reiterated, for example, until a terminating condition is reached. In some implementations, one or more of the individual steps shown in FIG. 6 can be executed as multiple separate steps, or one or more subsets of the steps shown in FIG. 6 can be combined and executed as a single step. In some implementations, one or more of the individual steps shown in FIG. 6 may also be omitted from the example method 600.

Figure 7:
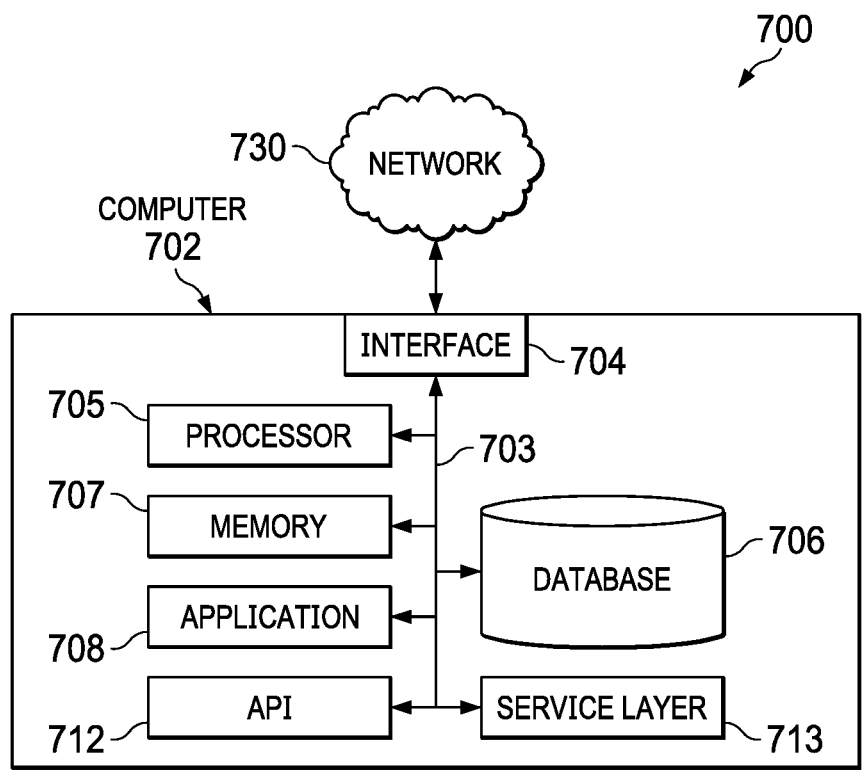
FIG. 7 is a block diagram illustrating an example computer system used to provide computational functionalities associated with described algorithms, methods, functions, processes, flows, and procedures as described in the instant disclosure, according to some implementations.

FIG. 7 is a block diagram of an example computer system 700 used to provide computational functionalities associated with described algorithms, methods, functions, processes, flows, and procedures as described in the instant disclosure, according to an implementation. The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicatively coupled with a network 730. In some implementations, one or more components of the computer 702 may be configured to operate within environments, including cloudcomputing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, or other server (or a combination of servers).

The computer 702 can receive requests over network 730 from a client application (for example, executing on another computer) and respond to the received requests by processing the received requests using the appropriate software application(s). In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713). The API 712 may include specifications for routines, data structures, and object classes. The API 712 may be either computer-language independent or dependent and may refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module, without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems that are connected to the network 730 (whether illustrated or not) in a distributed environment. Generally, the interface 704 comprises logic encoded in software or hardware (or a combination of software and hardware) and is operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702 or other components (or a combination of both) that can be connected to the network 730 (whether illustrated or not). For example, memory 707 can be random access memory (RAM), read-only memory (ROM), optical, magnetic, and the like, storing data consistent with this disclosure. In some implementations, memory 707 can be a combination of two or more different types of memory (for example, a combination of RAM and magnetic storage) according to particular needs, desires, or particular implementations of the computer 702 and the described functionality. Although illustrated as a single memory 707 in FIG. 7, two or more memories 707 (of the same or a combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 may be implemented as multiple applications 708 on the computer 702. In addition, although illustrated as integral to the computer 702, in alternative implementations, the application 708 can be external to the computer 702.

There may be any number of computers 702 associated with, or external to, a computer system containing computer 702, each computer 702 communicating over network 730. Further, the term "client", "user", and other appropriate terminology may be used interchangeably, as appropriate, without departing from the scope of this disclosure. Moreover, this disclosure contemplates that many users may use one computer 702, or that one user may use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

Figure 8:
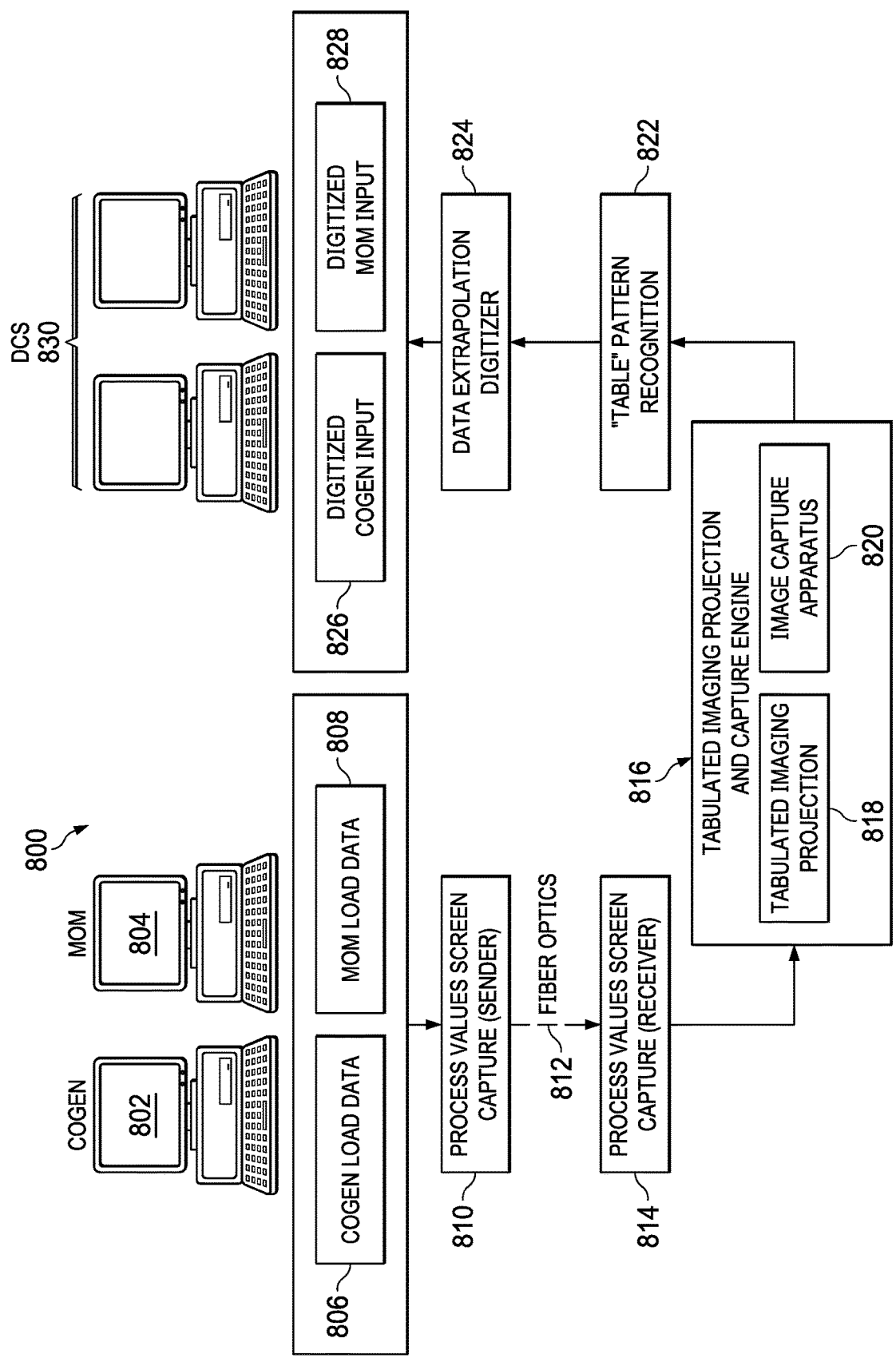
FIG. 8 is a block diagram illustrating an example system logical design flow, according to some implementations.

FIG. 8 is a block diagram illustrating an example system logical design flow 800, according to some implementations. In some implementations, the example system logical design flow 800 may include additional or different (or a combination of both) components not shown in the block diagram. In some implementations, components may also be omitted from the example system logical design flow 800.

As illustrated in FIG. 8, the example system logical design flow 800 includes a Cogen system 802, a MOM system 804, and a DCS 830. The Cogen system 802 can display process values (that is, Cogen load data 806) on a terminal of the Cogen system 802. Similarly, the MOM system 804 can display process values (that is, MOM lab samples 808) on a terminal of the MOM system 804. The process values (such as, the Cogen load data 806, the MOM lab samples 808) can be scanned from one or more terminals of the Cogen system 802 or the MOM system 804. For example, the process values (such as, the Cogen load data 806, the MOM lab samples 808) can be captured using hardware or software screen capture apparatus 810 and 814, respectively. The process values screen capture apparatus 810 can be connected to the process values screen capture apparatus 814 through, for example, fiber optics 812. The captured process values are transferred to a tabulated imaging projection and capture engine 816. In the tabulated imaging projection and capture engine 816, the process values can first be encoded in a tabulated imaging projection apparatus 818. Next, the created tabulated image can be captured, analyzed, and verified against an encoding algorithm by an image capture apparatus 820. Upon successful verification, the image capture apparatus 820 can send the captured image to a table pattern recognition apparatus 822, and then to a data extrapolation digitizer 824 to produce final outputs values (such as, digitized Cogen input 826, digitized MOM input 828) for the DCS 830.

As illustrated in FIG. 8, files are not transferred between the Cogen system 802 or the MOM system 804, and the DCS 830. Transferring files can also transfer malware imbedded in the files. Instead, only process values (such as, load parameters, including current, volts, and watts, on a cogeneration plant, blending optimization figures generated by IRIS for MOM) are extracted and transferred. The process values can be scanned from one or more terminals of the Cogen system 802 or one or more terminals of the MOM system 804 using a hardware or software based scanner (such as, Optical Character Recognition (OCR)). The scanned process values then can be integrated (or represented) in a visual table. The format of the table, including record field definitions, spacing, and arrangements of table contents, can be defined by a predefined mathematical relationship (such as, a predetermined algorithm). For example, if the process values are presented by an unauthenticated apparatus (that is, in a format not defined by the predefined mathematical relationship), the presented process values are considered as invalid process values.

In some implementations, the tabulated imaging projection and capture engine 816 can be designed only for tabulated information recognition. For example, the process values can be encoded in one or more tables (such as, one or more tabulated images) based on a predetermined algorithm (such as, formula (1) described in FIG. 3).

In some implementations, the tabulated imaging projection and capture engine 816 can be designed to ensure that process values transfer is authenticated, authorized, and validated, and to ensure information integrity during the information transfer. For information transfer authentication, the tabulated imaging projection and capture engine 816 can establish a mutual trust using a custom algorithm at the setup time. In doing so, a receiver of transferred information can trust a sender with the previously established mutual trust. A rogue sender (such as, a sender without the previously established mutual trust) can be ignored by the receiver, because the rogue sender cannot transmit information according to the pre-established algorithm. In some implementations, the algorithm can propose a custom "cryptographic nonce" based information embedded in visual noise (such as, rotating overlay, rotating overlay with blind spot). The sender of process control information can display nonce in different patterns embedded in visual noise at different time. The display patterns are controlled by the algorithm. After capturing the displayed image, the receiver can use the mutually agreed algorithm to extract the nonce, and to authenticate the sender. In some implementations, mutual authentication can be achieved by adding image capture function to the sender and image projection function to the receiver, so that the reverse authentication (that is, the sender authenticating the receiver before sending information to the receiver) can also be established. The reverse authentication can also be established based on risk calculations.

After authenticating the sender, information received from the sender can be authorized. For example, the receiver can extract the transferred information from the captured image according to the pre-established algorithm. In some implementations, the transferred information is a parameter-value pair. The authorization process can rely on, for example, a pre-established whitelist of allowed parameter-value pair. The receiver can use the mutually established contract at the setup time to establish the sender's authorization to send the particular parameter-value pair embedded in the visual image. If the parameter-value pair from the captured image does not comply with the whitelist, the receiver can drop the message, and inform its onboard risk calculation engine that, for example, a system glitch or an attack is detected. In some implementations, if the parameter-value pair display pattern within the captured image does not comply with the pre-established algorithm, the captured image can be dropped, and the onboard risk calculation engine can be informed.

After the received information is authorized, the received information is validated. The validation of the received information can ensure that data conforms to a pre-established rule. For example, the rule can establish attributes of allowable values (such as, acceptable range, acceptable change frequency, and acceptable units).

To ensure information integrity during the information transfer, there is no direct data link between the disparate systems for the information transfer. A 100% physical air gap is introduced between the two systems (such as, the Cogen system 802 and the DCS 830) to prevent corrupted data from reaching the receiver. Tampered data does not have a direct pathway from the sender to the receiver without first going through a validation mechanism. In addition, protocol conversion of binary data, which needs to be transferred, to a visual representation is proposed. For example, only whitelisted information, which needs to be transferred, is converted. Other information is ignored (that is, not converted and transferred). In doing so, only whitelisted information flows through after validation mechanism. Furthermore, information exchange between the sender and the receiver can be enforced by a pre-established contract. For routine information (such as, information transfer below acceptable risk value), the information can be transferred only if the information computes against an established whitelist, thus ensuring that only pre-established acceptable values are transferred. If the sender is compromised, the receiver cannot accept information from the sender beyond the pre-established acceptable values. For elevated risk information (such as, information transfer above acceptable risk value), additional layer of security can be incorporated to ensure the integrity of the system. For example, mutual authentication (described previously in the authentication process) can be used. After receiving information from the sender, the receiver can, for example, project a challenge to the sender. The sender then can respond to the challenge according to the pre-established algorithm. If the response to the challenge complies with the pre-established algorithm, the receiver can accept the received information. However, if the response to the challenge does not comply with the pre-established algorithm, the receiver can discard the received information, and inform its onboard risk calculation engine. If the receiver is tampered and cannot project a challenge conforming to the pre-established algorithm, the sender can inform its onboard risk calculation engine.

Figure 9:
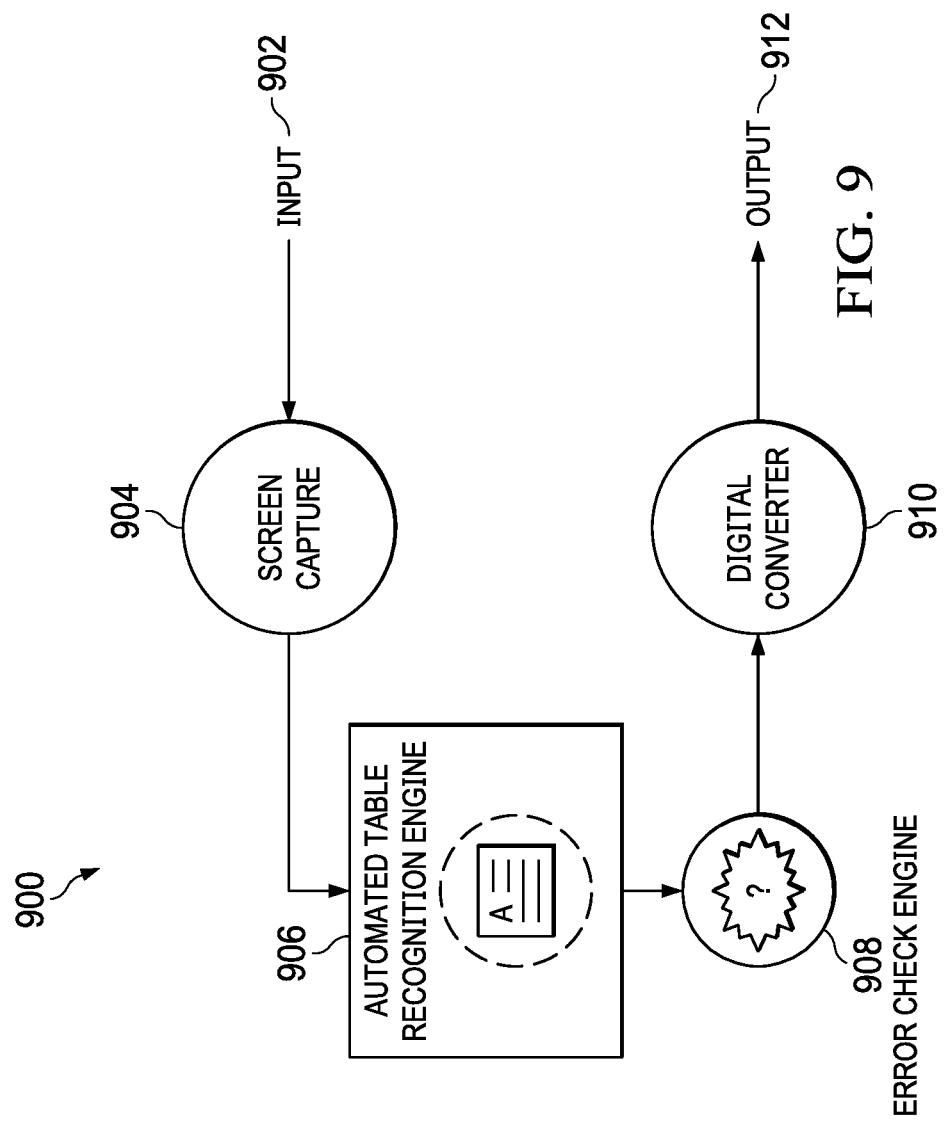
FIG. 9 is a block diagram illustrating an example image to digital conversion engine, according to some implementations.

FIG. 9 is a block diagram illustrating an example image to digital conversion engine 900, according to some implementations. In some implementations, the example image to digital conversion engine 900 may include additional or different (or a combination of both) components not shown in the block diagram. In some implementations, components may also be omitted from the example image to digital conversion engine 900.

As illustrated in FIG. 9, the example image to digital conversion engine 900 includes a screen capture device 904, an automated table recognition engine 906, an error check engine 908, and a digital converter 910. In some implementations, input 902 (such as, an image) is captured by the screen capture device 904. Next, the captured input is processed through the automated table recognition engine 906. The processed input is further verified for potential errors by the error check engine 908. Finally, the verified input is digitized by the digital converter 910 (such as, an optical-table digital converter component) to produce output 912 (such as, in digital format).

Figure 10:
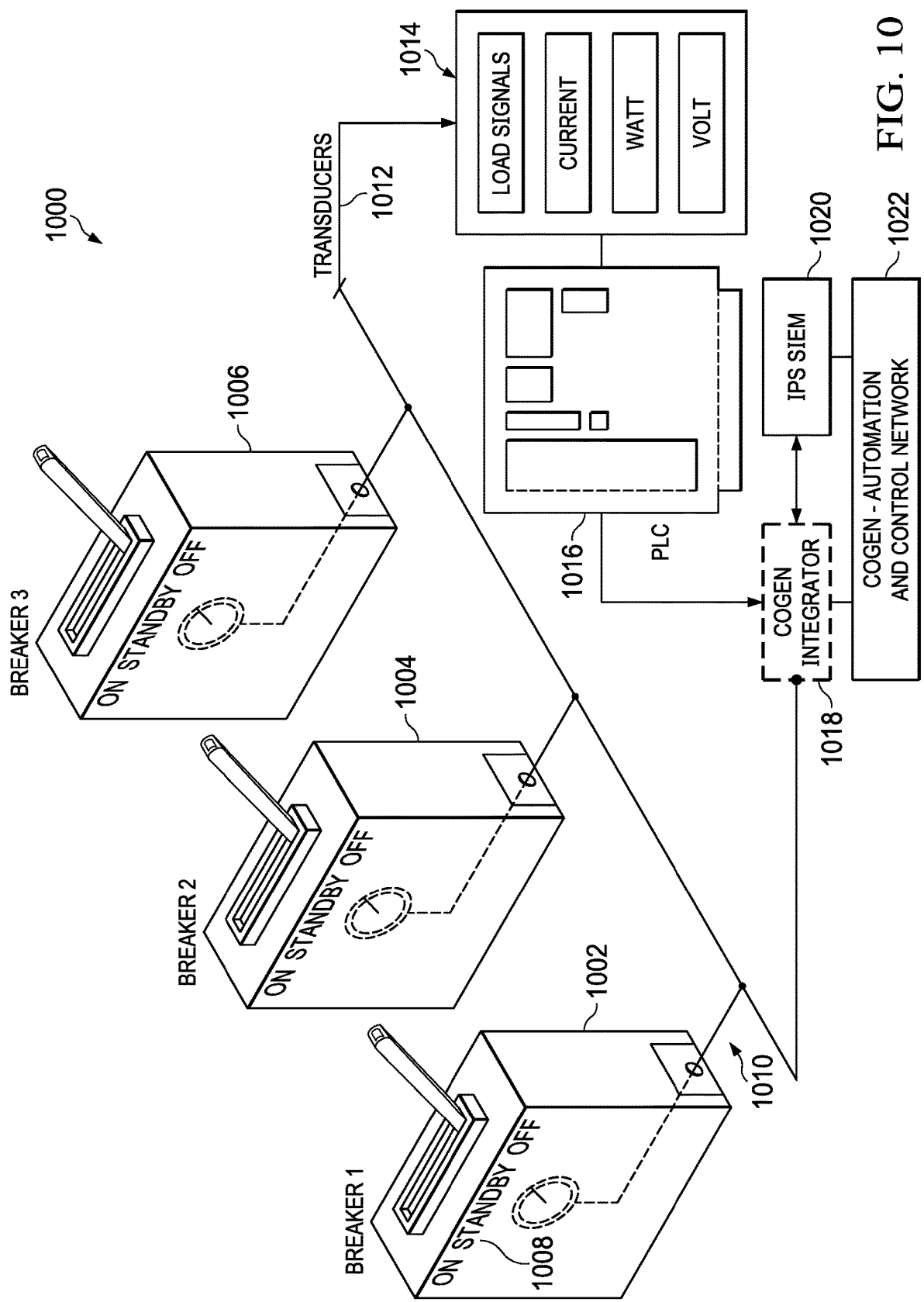
FIG. 10 is block diagram illustrating an example interaction environment for Cogen controller output augmented with risk level calculation, according to some implementations.

FIG. 10 is block diagram illustrating an example interaction environment 1000 for Cogen controller output augmented with risk level calculation, according to some implementations. In some implementations, the example interaction environment 1000 may include additional or different (or a combination of both) components not shown in the block diagram. In some implementations, components may also be omitted from the example interaction environment 1000.

As illustrated in FIG. 10, the example interaction environment 1000 includes three breaker control circuitries 1002, 1004, and 1006, transducers 1012, a PLC 1016, a Cogen integrator 1018, IPS and SIEM devices 1020, and Cogen automation and control network 1022. In some implementations, a controller output (such as the PLC 1016) can be augmented with risk level calculation produced by the Cogen integrator 1018. For example, the transducers 1012 can convey load signals 1014 (such as, current, volts, and watts) to the PLC 1016 to control the breaker control circuitries (such as, 1002, 1004, and 1006). Instead of a direct communication with the breaker control circuitries in a legacy breaker control system, the PLC 1016 can communicate with the breaker control circuitries through the Cogen integrator 1018. The Cogen integrator 1018 can perform internal risk calculation augmented by input from the IPS and STEM devices 1020. Based on the overall risk calculation, the Cogen integrator 1018 can issue an augmented command 1010 to place, for example, the breaker control circuitry 1002 on standby mode 1008, until a further action is performed by a system administrator.

Figure 11:
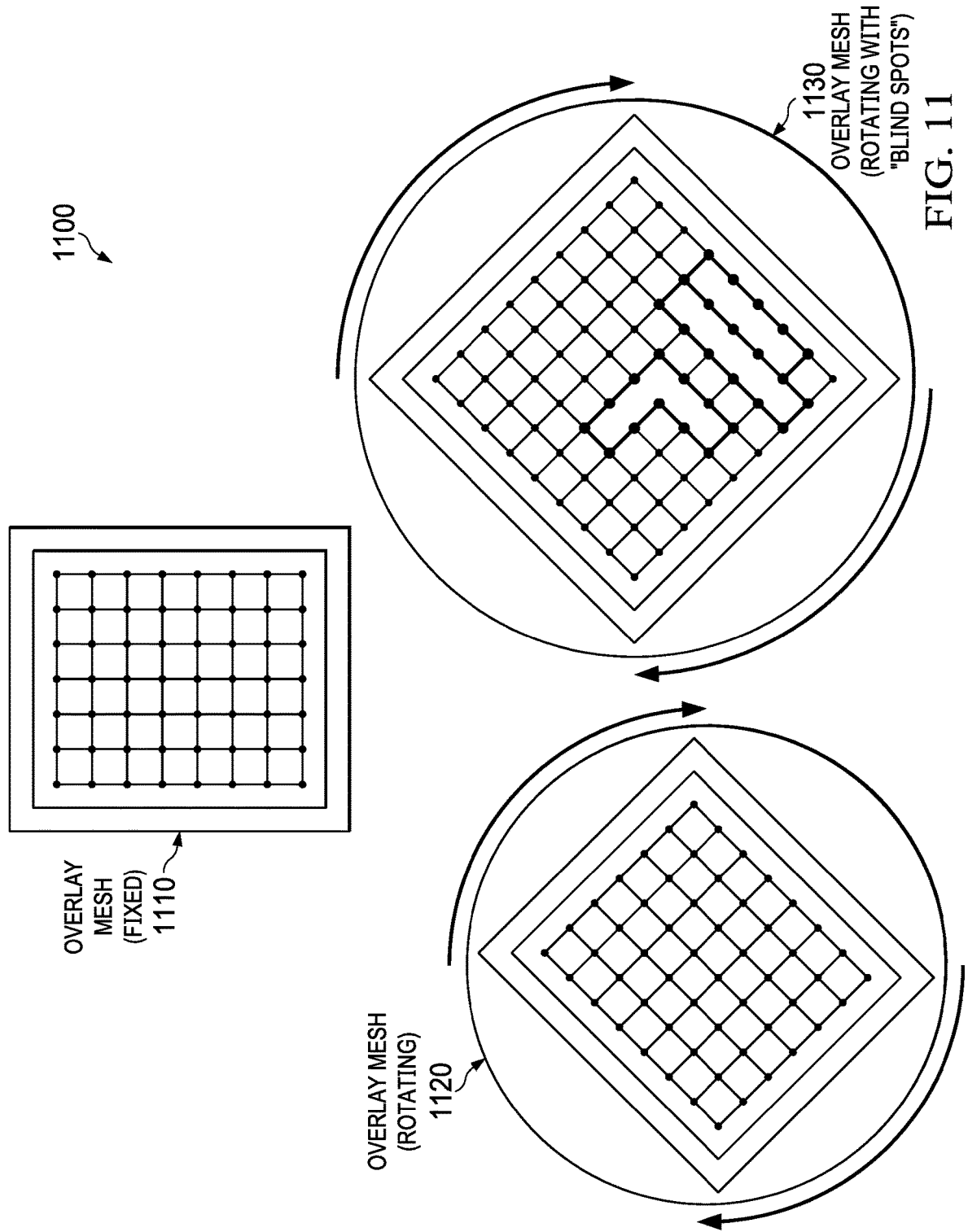
FIG. 11 illustrates example states of an overlay mesh, according to some implementations.

FIG. 11 illustrates example states 1100 of an overlay mesh, according to some implementations. The overlay mesh is a digital image overlay that is spaced to allow single character per void. For example, a fixed overlay mesh 1110 does not rotate, and is projected in accordance to a time sequence controlled by a synchronization clock. A rotating overlay mesh 1120 is an overlay mesh rotating in accordance with a synchronization clock between a sender and a receiver. In some implementations, a rotating overlay mesh can be augmented with blind spots to produce a rotating overlay mesh with blind spots 1130. Characters in the blind spots placed in accordance to an agreed upon algorithm are ignored. The blind spot measure can be used to provide additional stringency in data verification and validation.

Figure 12:
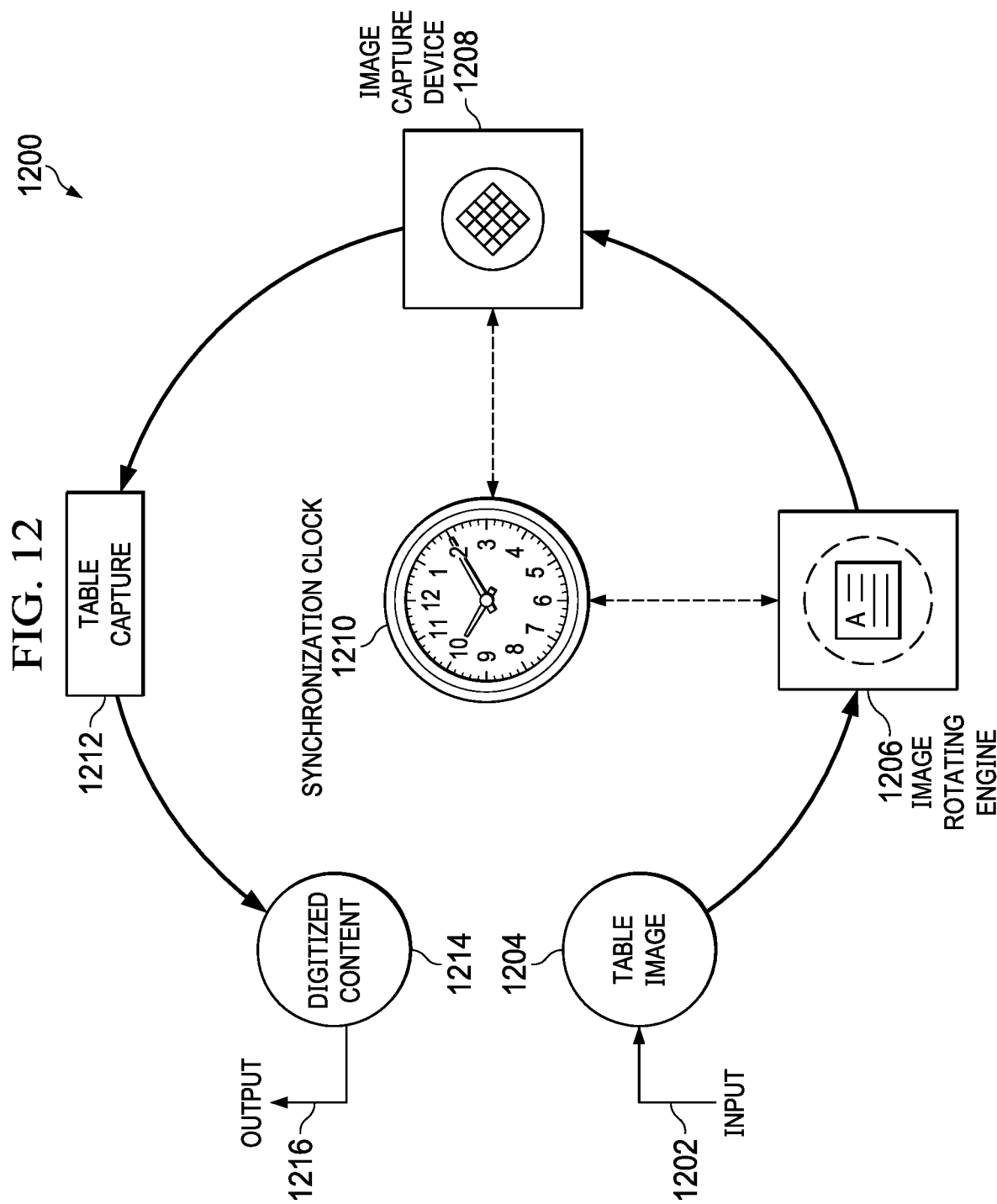
FIG. 12 is a block diagram illustrating an example rotating overlay logic flow, according to some implementations.

FIG. 12 is a block diagram illustrating an example rotating overlay logic flow 1200, according to some implementations. In some implementations, the example rotating overlay logic flow 1200 may include additional or different (or a combination of both) components not shown in the block diagram. In some implementations, components may also be omitted from the example rotating overlay logic flow 1200.

As illustrated in FIG. 12, the example rotating overlay logic flow 1200 includes an image rotating engine 1206, an image capture device 1208, a synchronization clock 1210, and a table capture device 1212. In some implementations, input 1202 can be screen captured page by page to create table image 1204. The table image 1204 is fed into the image rotating engine 1206. The image rotating engine 1206 can select a rotation format (such as, fixed, rotating, or rotating with blind spots). At the receiving side, the image capture device 1208 can apply the selected overlay format. The rotation direction, speed, and alternating frequency can be controlled by the synchronization clock 1210. The captured image can be sent to the table capture device 1212, before converting to digitized content 1214 to produce output 1216.

Figure 13:
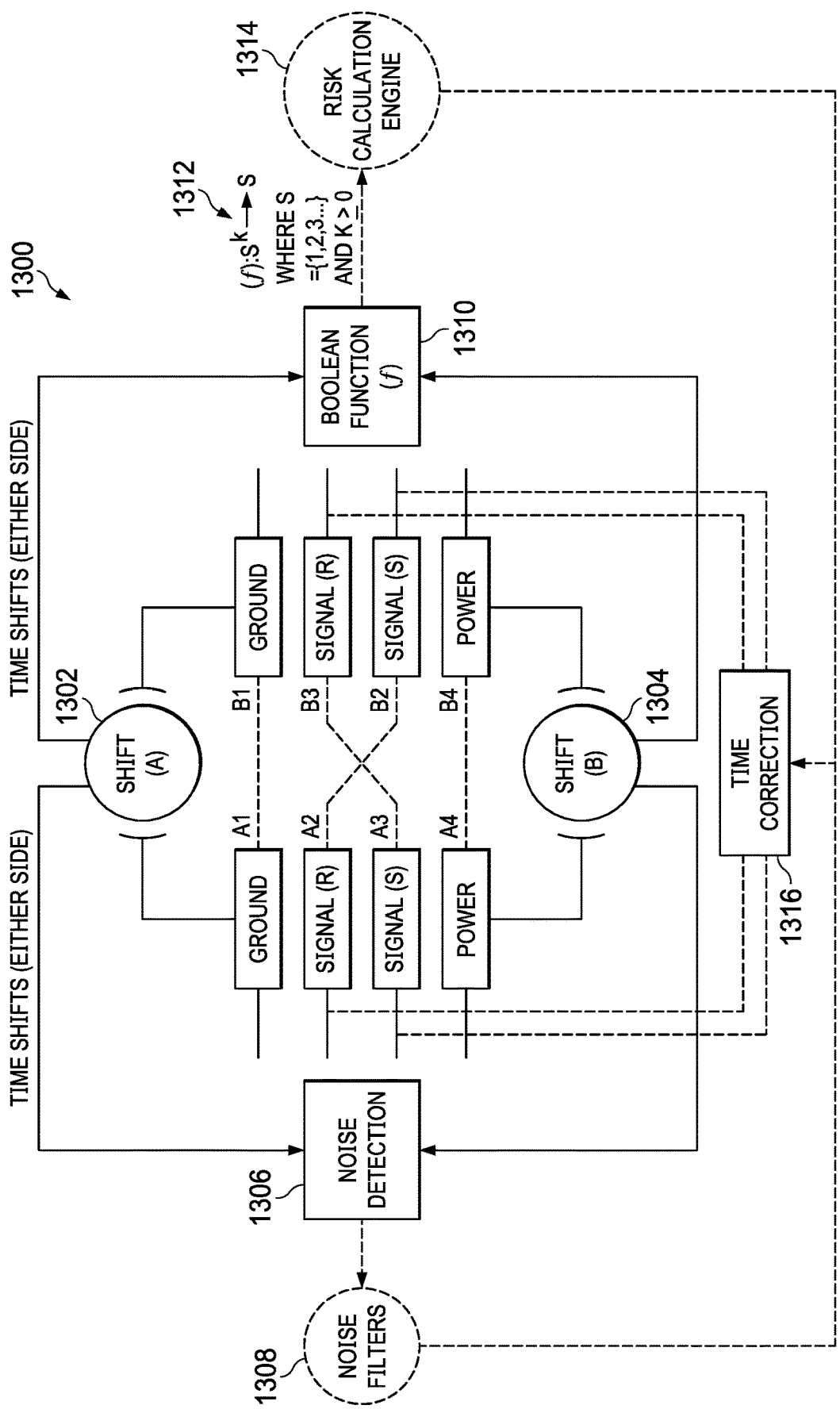
FIG. 13 is a block diagram illustrating an example clock synchronization circuitry, according to some implementations.

FIG. 13 is a block diagram illustrating an example clock synchronization circuitry 1300, according to some implementations. In some implementations, the example clock synchronization circuitry 1300 may include additional or different (or a combination of both) components not shown in the block diagram. In some implementations, components may also be omitted from the example clock synchronization circuitry 1300.

As illustrated in FIG. 13, the example clock synchronization circuitry 1300 includes two shift sensors 1302 and 1304, a noise detection 1306, noise filters 1308, a Boolean function 1310, a risk calculation engine 1314, and time correction 1316. In some implementations, the example clock synchronization circuitry 1300 can calculate potential shift based on inputs from the two shift sensors 1302 and 1304. The inputs from the two shift sensors 1302 and 1304 can be based on OSI level 1 (that is, the physical layer) for the noise filters 1308 conveyed by the noise detection 1306. The inputs from the two shift sensors 1302 and 1304 can be based on OSI level 7 (that is, the application layer) for cyber security threat events, generated by an onboard risk calculation engine 1314 and conveyed by the Boolean function 1310 (such as, transformed using the formula 1312). After the noise filters 1308 and the risk calculation engine 1314, a synchronization clock can apply the required time correction factor at the time correction 1316.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or be described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20, or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:
1. A method comprising:
   calculating, by at least one of a first device and a second device, a risk level; and
   controlling, by the at least one of the first device and the second device, a switch based on the risk level, wherein:
      if the risk level is less than a predetermined value, the switch is controlled to power on an image display and capturing device, wherein data is displayed by the first device and received by the second device through visual recognition on the image display and capturing device; and
      if the risk level is not less than the predetermined value, the switch is controlled to power off the image display and capturing device, wherein data transfer from the first device to the second device through visual recognition on the image display and capturing device is stopped.

2. The method of claim 1, wherein the image display and capturing device is a tabulated image display and capturing device, the method further comprising generating, on behalf of control systems, actions for improved decision making and normalization of plant operation.

3. The method of claim 1, wherein the data are process variables, the method further comprising:
receiving, by the second device and from a system, a data request;
transmitting, by the second device and to the first device, the data request;
obtaining, by the first device and from a third party system, the requested data, wherein obtaining the requested data includes extracting the process variables from the third party system; and
transmitting, by the first device and to the second device, the requested data through tabulated visual recognition on the image display and capturing device.

4. The method of claim 3, further comprising before transmitting, by the first device and to the second device, the requested data through tabulated visual recognition on the image display and capturing device, authenticating the second device by the first device.

5. The method of claim 3, wherein the third party system is a cogeneration power plant and the system is a process plant's Distributed Controls System (DCS).

6. The method of claim 3, wherein the third party system is a Manufacturing Operations Management (MOM) system and the system is a refinery automation system.

7. The method of claim 3, wherein the risk level is associated with cyber security.

8. The method of claim 1, wherein the data is displayed by the first device in a tabular form and received by the second device through Tabulated Imaging Recognition (TIR) on the image display and capturing device.

9. The method of claim 1, wherein the data is displayed as a tabulated image based on a predetermined mathematical formula.

10. The method of claim 1, wherein the data is displayed based on a rotating image overlay method, the rotating image overlay method includes at least one of clockwise rotating overlay, counter clockwise rotating overlay, and rotating overlay with blind spot, and the rotating image overlay method is performed based on a synchronization clock.

11. The method of claim 1, further comprising controlling field instruments to place breaker control on standby mode if the risk level is not less than the predetermined value.

12. The method of claim 1, wherein calculating the risk level includes performing security assessment based on information from at least one of a firewall, an Intrusion Prevention System (IPS), an Intrusion Detection System (IDS), and a Security Incident and Event Management (SIEM) platform.

13. The method of claim 1, wherein the first device, the second device, the image display and capturing device, and the switch are part of an integration device.

14. A device comprising:
a memory; and
a processing unit that is arranged to perform operations including:
calculating, by at least one of a first device and a second device, a risk level; and
controlling, by the at least one of the first device and the second device, a switch based on the risk level, wherein:
if the risk level is less than a predetermined value, the switch is controlled to power on an image display and capturing device, wherein data is displayed by the first device and received by the second device through visual recognition on the image display and capturing device; and
if the risk level is not less than the predetermined value, the switch is controlled to power off the image display and capturing device, wherein data transfer from the first device to the second device through visual recognition on the image display and capturing device is stopped.

15. The device of claim 14, wherein the image display and capturing device is a tabulated image display and capturing device, the operations further comprising generating, on behalf of control systems, actions for improved decision making and normalization of plant operation.

16. The device of claim 14, wherein the data is displayed by the first device in a tabular form and received by the second device through Tabulated Imaging Recognition (TIR) on the image display and capturing device.

17. The device of claim 14, wherein the data is displayed as a tabulated image based on a predetermined mathematical formula.

18. The device of claim 14, wherein the data is displayed based on a rotating image overlay method, the rotating image overlay method includes at least one of clockwise rotating overlay, counter clockwise rotating overlay, and rotating overlay with blind spot, and the rotating image overlay method is performed based on a synchronization clock.

19. The device of claim 14, the operations further comprising controlling field instruments to place breaker control on standby mode if the risk level is not less than the predetermined value.

20. A non-transitory computer-readable medium storing instructions executable by a computer system to perform operations comprising:
calculating, by at least one of a first device and a second device, a risk level; and
controlling, by the at least one of the first device and the second device, a switch based on the risk level, wherein:
if the risk level is less than a predetermined value, the switch is controlled to power on an image display and capturing device, wherein data is displayed by the first device and received by the second device through visual recognition on the image display and capturing device; and
if the risk level is not less than the predetermined value, the switch is controlled to power off the image display and capturing device, wherein data transfer from the first device to the second device through visual recognition on the image display and capturing device is stopped.

* * * * *